US012229712B1

(12) United States Patent
Merchan et al.

(10) Patent No.: US 12,229,712 B1
(45) Date of Patent: Feb. 18, 2025

(54) SYSTEMS AND METHODS FOR ROAD NETWORK AWARE GEOGRAPHICAL UNIT GENERATION

(71) Applicant: Amazon Technologies, Inc., Seattle, WA (US)

(72) Inventors: Daniel Esteban Merchan, Austin, TX (US); Dipal Patel Gupta, Issaquah, WA (US); Jatin Arora, Panchkula (IN); Bhargav Kunkulagunta, Hyderabad (IN); Julian Enrique Pachon, Austin, TX (US); Rohit Malshe, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 17/747,866

(22) Filed: May 18, 2022

(51) Int. Cl.
G06Q 10/0835 (2023.01)
G01C 21/00 (2006.01)

(52) U.S. Cl.
CPC .............................. G06Q 10/08355 (2013.01)

(58) Field of Classification Search
None
See application file for complete search history.

(56) References Cited

U.S. PATENT DOCUMENTS

| | | | |
|---|---|---|---|
| 7,363,126 B1* | 4/2008 | Zhong | G01C 21/3484 701/25 |
| 10,142,255 B1* | 11/2018 | Pachon | G06Q 10/08355 |
| 10,360,760 B2* | 7/2019 | Northrup | H04W 4/02 |
| 10,453,004 B2* | 10/2019 | Davidson | G06Q 10/08355 |
| RE47,985 E * | 5/2020 | Heed | G06Q 10/047 |
| 10,657,768 B2* | 5/2020 | Northrup | G06Q 30/0238 |
| 10,860,967 B2* | 12/2020 | Wilkinson | G06Q 10/083 |
| 11,587,001 B2* | 2/2023 | Lassoued | G05D 1/0027 |
| 11,847,603 B1* | 12/2023 | Roy Chowdhury | G06Q 10/083 |
| 2006/0100777 A1* | 5/2006 | Staton | B60R 25/04 701/468 |
| 2009/0265091 A1* | 10/2009 | Machii | G01C 21/3492 701/532 |
| 2016/0341554 A1* | 11/2016 | Hillier | G01C 21/3852 |
| 2017/0055124 A1* | 2/2017 | Staton | B60R 25/102 |
| 2018/0372503 A1* | 12/2018 | Bagchi | G06N 20/00 |
| 2019/0228375 A1* | 7/2019 | Laury | G05D 1/0088 |

(Continued)

Primary Examiner — Jonathan M Dager
(74) Attorney, Agent, or Firm — Kilpatrick Townsend & Stockton LLP

(57) ABSTRACT

Techniques for dividing a geographical area into districts are described herein. Geospatial vector data, barrier geospatial vector data, road infrastructure data, and historical delivery demand data for a geographical area may be obtained. A plurality of clusters from a stratified sampling of data points for the delivery demand data and barrier penalties from a barrier-aware road graph are generated. A first set of polygons for the plurality of clusters may be generated using a concave hull algorithm. A second set of polygons may be generated using a barrier constrained network Voronoi algorithm that uses the barrier-aware road graph and the first set of polygons as seeds. The second set of polygons may be modified using a bounded Voronoi algorithm that uses a raster cost allocation based on barrier penalties. Coordinates for each polygon of the modified second set of polygons are determined that divide the geographical area.

20 Claims, 14 Drawing Sheets

(56) References Cited

U.S. PATENT DOCUMENTS

| | | | |
|---|---|---|---|
| 2019/0301892 A1* | 10/2019 | Santilli | G01C 21/3664 |
| 2020/0250614 A1* | 8/2020 | Zhu | G06Q 10/0836 |
| 2020/0349511 A1* | 11/2020 | Seaver | G06Q 10/06312 |
| 2022/0146278 A1* | 5/2022 | Takeda | G01C 21/3889 |

* cited by examiner

SYSTEMS AND METHODS FOR ROAD NETWORK AWARE GEOGRAPHICAL UNIT GENERATION

BACKGROUND

Some merchants and e-commerce organizations offer delivery of their goods to a consumer's residence as a service. As cities and towns grow larger and population density increases, it becomes more difficult to generate efficient delivery routes for the goods. For example, conventional route planning engines that develop routes for delivery vehicles to deliver packages to consumers' residencies may generate delivery routes that are too long (e.g., crossing heavy traffic areas multiple times on the same route) or are unbalanced and inconsistent. In addition, it is difficult to divide a work force into logical geographical blocks to maintain high levels of geographical familiarity for delivery drivers. Current route planning engines may use conventional jurisdiction division techniques to determine which routes are applicable to which areas and thus generate flawed delivery routes. Moreover, conventional jurisdiction division techniques for a delivery area are generated inefficiently as many techniques involve manual drafting of the areas, which fails to account for delivery road networks and barriers.

BRIEF DESCRIPTION OF THE DRAWINGS

Various embodiments in accordance with the present disclosure will be described with reference to the drawings, in which.

DETAILED DESCRIPTION

Figure 1:
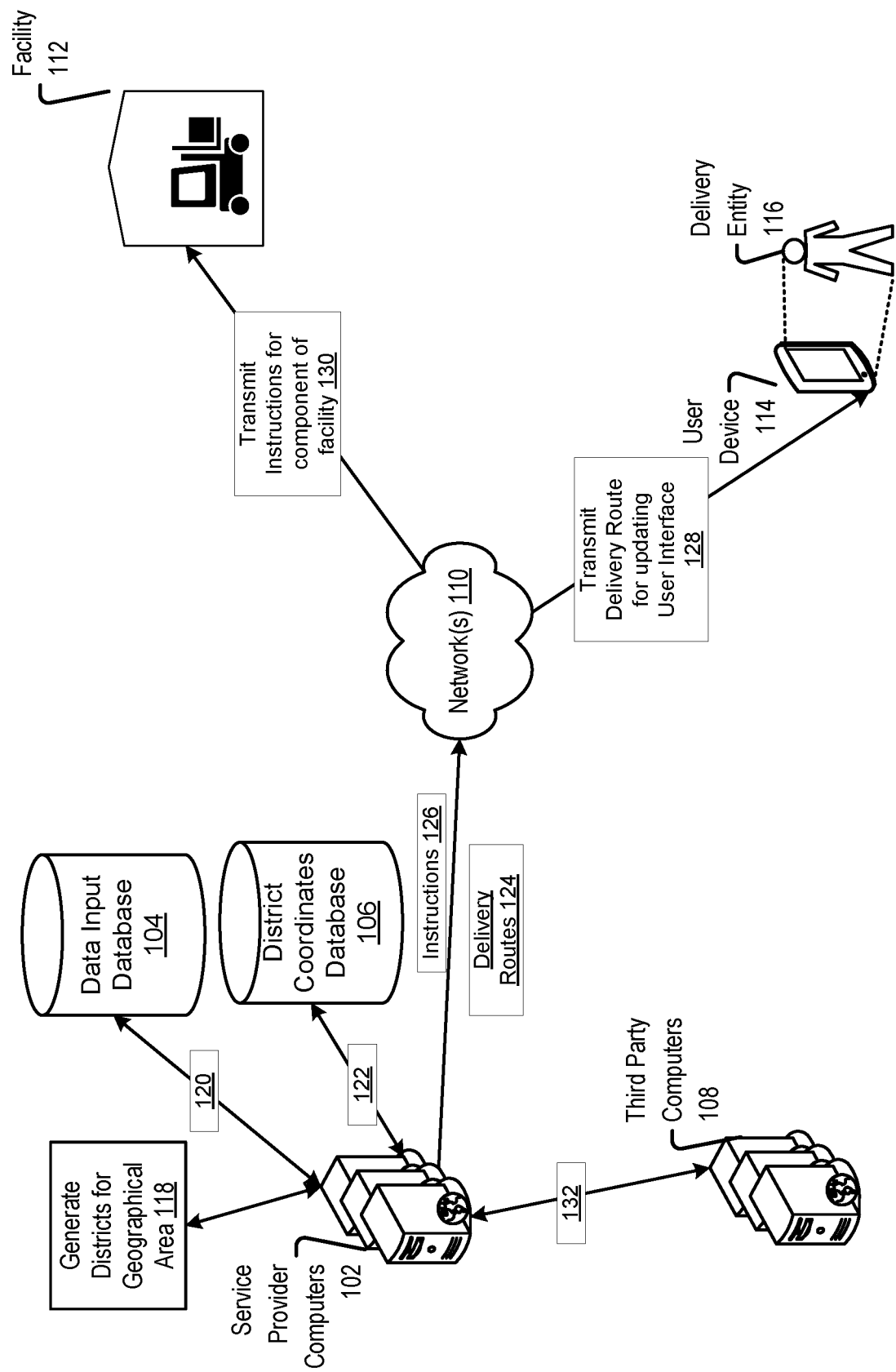
FIG. 1 illustrates an example workflow for a district generation feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a district generation feature for generating districts (e.g., geographical units), which divide a geographical area. The districts may be used to generate efficient and consistent delivery routes for the geographical area and also to divide items/packages stored in facilities within the geographical area into manageable sub-groups. In embodiments, a service provider computer (service provider computers) implementing the district generation feature may be configured to utilize one or more of several different types of algorithms (e.g., stratified sampling algorithm, capacitated K-means algorithm, concave hull algorithm, Geoatom algorithm, barrier constrained Voronoi algorithm, bounded Voronoi algorithm, raster-based cost allocation algorithm (raster cost allocation), or other suitable algorithms), and a number of different data inputs for the geographical area to generate the districts, which divide the geographical area. An example of a district is a set of geographical coordinates that define a boundary for a portion of a geographical area. A portion or sector of a geographical area may be uniquely assigned to each district that is generated for the geographical area. In embodiments, a geographical area may include an area that is defined using units of geography such as a standardized unit of geography represented in a ZIP code, a postal code, neighborhoods, census tracts, or ZIP code tabulation areas. In some embodiments, the geographical area boundaries may be defined in a data input received or otherwise obtained by the service provider computers.

In embodiments, the district generation feature determines and assigns complex polygons that represent portions of the geographical area to specific districts that result in districts that are barrier aware and road-network aware. The division of a geographical area into districts can result in districts that establish a clear division between each other and also promote optimized delivery routes within each district, as each one is road-network and barrier aware. The district generation feature includes a process for portioning the geographic area into many complex polygons, which utilizes various algorithms to generate the polygons that respect barriers within the geographic area but also divide the districts to maximize the road network of the geographical area. In accordance with at least one embodiment, the district generation feature includes using a number of data inputs such as geospatial vector data, barrier geospatial vector data, road infrastructure data, and historical delivery demand data for the geographical area. The data inputs may be used to determine a spatial distribution of data points from the historical delivery demand data for the geographical area. Each data point of the spatial distribution may then be assigned to a size and barrier constrained cluster by using a capacitated K-means algorithm that utilizes barrier-penalized constraints and other constraints such as demand volume constraints. The service provider computers may utilize a concave hull algorithm to convert the point-based assignments of the clusters to concave hull polygons, with each cluster corresponding to a concave hull polygon. Each concave hull polygon may serve as an initial basis for the coordinates of a representative district which divides the geographical area. The district generation feature utilizes a number of algorithms and geometry techniques to expand the concave hull polygons to the final complex polygons that represent each district and are road-network and barrier aware polygons.

In accordance with at least one embodiment, the district generation feature may be used to redraw or recalculate the districts assigned to a geographical area based at least in part on the addition or deletion of delivery service providers for the geographical area, a new split or share of the geographical area among current delivery service providers, or based on updated delivery demand data for certain portions of the geographical area. In embodiments, the service provider computers implementing the district generation features determine and assign polygons to the districts of the geographical area. For example, 12 distinct districts and polygons may be determined for a geographical area using the district generation features described herein. In embodiments, the 12 districts may be used to generate a plurality of delivery routes to deliver items to delivery locations within the geographical area. These delivery routes may be optimized (e.g., reduced overall trip length to complete a task of delivering an item) based at least in part on the coordinates for each district. For example, delivery routes may be generated such that a delivery entity avoids crossing from one district to another district while being aware of barriers such as rivers, lakes, and major highways, and with respect to the road-network within each district to optimize travel time. As generated delivery routes may be limited to a specific district, delivery entities may build familiarity with the routes and district to further increase efficiency during delivery of an item.

In embodiments, the service provider computers may receive or otherwise obtain geospatial vector data and barrier geospatial vector data for a geographical area. The geospatial vector data and barrier geospatial vector data may be maintained as a Shapefile. The service provider computers implementing the district generation feature may access, modify, and maintain one or more Shapefiles, databases, or data sources during the generation and assignment of the polygons to each district of a geographical area. A Shapefile may include a nontopological format for storing geometric location and attribute information of geographic features and may be represented as points, lines, or polygons. The geographical area, data inputs, and polygons generated for the geographical area by the service provider computers may include geospatial vector data usable in a geospatial vector data format by a computer system. The processes and systems described herein may be an improvement on conventional geographical area division techniques, which are used in route generation and planning for delivery of packages to a geographical area. For example, conventional geographical area division techniques may utilize manually drawn polygons, which can be time intensive and rely on intimate knowledge of the geographical area. Many times, such techniques require a delivery company to send an enormous amount of work force on the road to achieve this. Moreover, conventional techniques do not account properly for barriers located in the geographic area, nor are they built with road-awareness (e.g., optimizing districts so as not to create inefficient delivery routes for a district). As such, the districts that divide a geographical area using conventional techniques lead to areas that may not be covered and the generation of non-optimized delivery routes that may cross boundaries between districts and barriers. This can result in missed demand opportunities and impacts customer service quality for delivery entities. Non-optimized delivery routes may be unbalanced, thereby creating even more inefficient delivery of packages as one delivery associate may be overwhelmed while another delivery associate is underutilized. Delivery associates may be unable to build up familiarity with or affinity with a particular district generated using conventional district generation techniques. Delivery drivers may have to cross highways through circuitous paths, thereby spending an excessive amount of driving time on the road.

The district generation feature implemented by the systems described herein results in increased delivery associate familiarity with a district in a geographic area as well as cost savings for the equipment associated with the delivery associates and distribution centers as the delivery associates drive fewer miles while accomplishing a more balanced and efficient delivery route. Attrition of delivery associates can be lowered by increasing familiarity with a district, as delivery routes generated from inefficient, unbalanced, or incorrect geographical area division results in delivery routes that cross boundaries of different districts and barriers. Increased familiarity with a district's delivery routes within the geographical area can also provide more efficiency in route delivery as delivery associates are better able to navigate road networks and geographical obstructions and dynamically generate slight alterations to a route to account for unforeseen variables such as traffic accidents or power outages within the district. The package load balancing among delivery routes generated for a district can also reduce attrition of delivery associates and provide increased delivery times for packages within a district as one delivery associate is not overwhelmed while another delivery associate is underutilized. The features described herein may also provide dynamic route planning solutions as the delivery routes can be updated by redesigning the districts for a geographical area based at least in part on updated delivery demand volume, population density data, and/or other information instead of being tied to a predefined distribution center/facility that could result in more inefficient delivery. Computer systems implementing the district generation features described herein may utilize less resources as districts that divide a geographical area and delivery routes created for the districts are generated infrequently. This can reduce variability in delivery routes whereas current conventional systems may utilize more resources by redesigning delivery routes for a geographical area each day attempting to account for a larger amount of variables thereby generating inefficient routes.

FIG. 1 illustrates an example workflow 100 for a district generation feature, in accordance with at least one embodiment. The workflow 100 of FIG. 1 includes service provider computers 102, data input database 104, district coordinates database 106, third party computers 108, networks 110, facility 112, and user device 114 associated with a delivery entity 116. The workflow 100 depicts the service provider computers implementing the district generation features described herein generating districts for a geographical area at 118 by obtaining 120 data inputs from data input databases 104. It should be noted that although workflow 100 depicts the service provider computers maintaining and accessing data inputs for a geographical area from data input database 104, in some embodiments the service provider computers may maintain and access the data inputs from other data sources such as other computer systems (third party computers 108) or extract the data from Shapefiles associated with the geographical area.

The service provider computers 102 may determine and store 122 the coordinates for each district of the geographical area in the district coordinates database 106. As described herein, the service provider computers may utilize a number of algorithms to determine complex polygons that represent districts for a geographical area using the data inputs from the data input database 104. In embodiments, the data input database 104 may include the data inputs for use by the algorithms implemented by the service provider computers 102 for generating the districts that divide the geographical area corresponding to the district generation feature. For example, the data input database 104 may include geospatial vector data, barrier geospatial vector data, road infrastructure data, and historical delivery demand data for the geographical area. Other data inputs such as regulatory constraint information for the geographical area and other user-specified inputs such as input that identifies a number of districts to be generated for the geographical area may be stored and accessed in data input database 104. In embodiments, the service provider computers 102 may generate a barrier-aware road graph using the road infrastructure data and the barrier geospatial vector data for the geographical area. In accordance with at least one embodiment, the barrier-aware road graph includes a planar graph that is generated by the service provider computers 102 using the road infrastructure data and the barrier geospatial vector data for the geographical area. In the planar graph, each road segment is an edge, and each intersection is a node. The service provider computer 102 is configured to determine a realistic point-to-point driving distance along the barrier-aware road graph by setting the weight of each edge to the driving distance of the road segment. Additionally, multiplicative penalties are assigned to the edges of the barrier-aware road graph to road segments which cross a barrier (e.g., major highway, railroad, river, etc.).

In embodiments, the service provider computers 102 may utilize configurable parameters $p_H$ and $p_S$ which correspond to hard and soft barriers, respectively, where $1 \leq p_S \leq p_H \leq 50$. By utilizing these configurable parameters, the service provider computers 102 can prevent two points on opposite sides of a barrier from being assigned to the same district—unless absolutely required. The shortest path distances determined for this barrier-aware road graph represent the assignment cost for a capacitated K-means algorithm which is utilized when determining clusters of data points, which are later used when generating concave hull polygons, discussed below in more detail with reference to FIGS. 3 and 5. In embodiments, the service provider computes 102 may utilize the generated barrier-aware road graph, a spatial distribution of data points from the historical delivery demand data using a stratified sampling algorithm, and several other algorithms to generate the districts that divide the geographical area. Once the districts have been determined, the coordinates that define the districts can be identified and stored in the district coordinate database 106. Although FIG. 1 and the associated description refer to determining districts to divide a single geographical area, the embodiments disclosed herein are not limited to such use cases. Instead, the service provider computers 102 may determine districts that divide a number of geographical areas using data inputs for each of the geographical areas.

As the districts generated by service provider computers 102 result in districts which are barrier and road network aware, the service provider computers 102 may generate optimized delivery routes 124 as well as instructions 126 for components of facility 112. As illustrated in FIG. 1, the delivery routes 124 may be transmitted 128 from service provider computers 102, via networks 110, to a user device 114 for presentation to a delivery entity 116. The transmission 128 of the delivery routes 124 may cause graphical updates to a user interface presented via user device 114 to guide or instruct delivery entity 116 to utilize an optimal route to deliver packages within a given district for the geographical area. As the districts are generated to respect barriers and be road network aware, the delivery routes 124 generated by service provider computers 102 will avoid crossing major barriers such as major highways or waterways (if possible) and utilize the most efficient route to get from point A to point B within each district. In accordance with at least one embodiment, the service provider computers 102 may generate a sequence trace route which assigns a certain sequence between all the districts for a geographical area. The sequence trace route may be used by the service provider computers 102 when generating the delivery routes 124.

The instructions 126 generated by the service provider computers 102 may be transmitted 130 to components or a computer (not pictured) associated with facility 112. The instructions 126 may be configured to activate, modulate, or otherwise instruct components or actuators of components to divert, move, or otherwise transfer inventory (items or packages) stored within facility 112 based on the generated districts. For example, certain portions of facility 112 may be assigned to store items that are intended to be delivered to each district. As districts are defined or updated for a geographical area, the inventory stored in facility 112 may need to be moved or transferred (within facility 112 or to another facility (not pictured)) to optimize delivery to said districts. For example, inventory of the facility 112 may be moved from a first portion of bins to a second and different portion of bins within the facility 112. The workflow 100 depicts service provider computers 102 in communication 132 with third party computers 108. In accordance with at least one embodiment, the service provider computers 102 may receive a request and data from third party computers 108 to determine districts for a geographical area defined by an entity associated with the third party computers 108. For example, a food delivery service may be responsible for delivering food to one or more neighborhoods of a city. To determine optimal delivery routes, the third party computers 108 may transmit the boundaries of the geographical area (geospatial vector data) in question along with their own historical delivery demand data. The service provider computers 102 may utilize the other data inputs for the geographical area in question (e.g., road infrastructure data and barrier geospatial vector data) to divide the geographical area into districts as well as determine optimal delivery routes for the districts. The district coordinates and delivery routes for the third party may be transmitted back to the third party computers 108 for implementation by the food delivery service.

Figure 2:
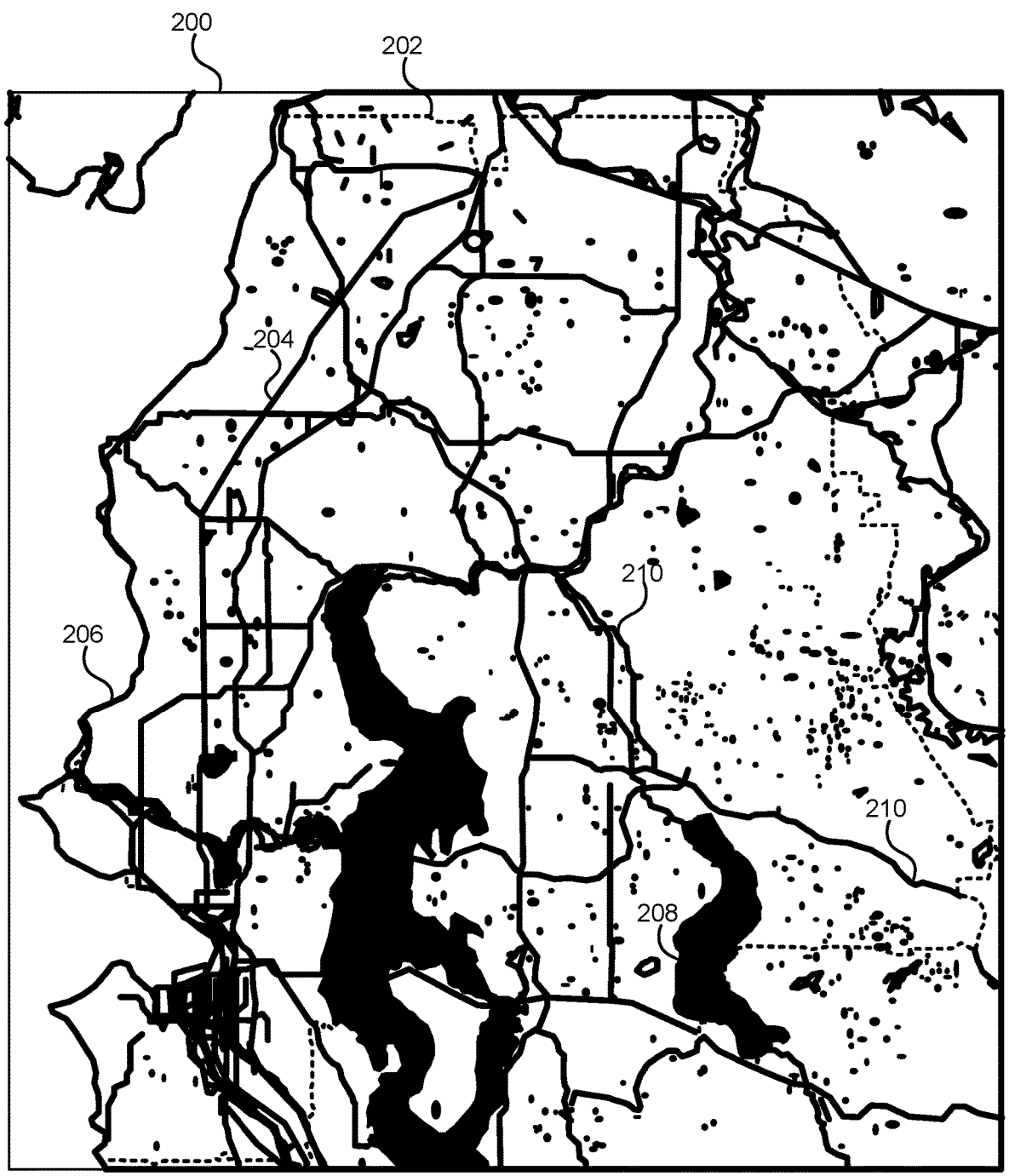
FIG. 2 illustrates an example representation of barrier geospatial vector data for a geographical area for use in a district generation feature, in accordance with at least one embodiment.

FIG. 2 illustrates an example representation of barrier geospatial vector data for a geographical area for use in a district generation feature, in accordance with at least one embodiment. FIG. 2 depicts an example representation of barrier geospatial vector data for geographical area 200. The example representation includes boundaries 202 (represented as dashed lines) of the geographical area 200 as defined by a user or identified in the geospatial vector data for the geographical area 200. In embodiments, the barrier geospatial vector data includes railways, natural barrier data (including rivers, large water bodies, coastlines, and parks), and major highways modeled as barriers for the geographical area 200.

For example, as depicted in FIG. 2, the example representation of barrier geospatial vector data for the geographical area includes railway 204, coastline 206, lake 208, and major highways 210. As described with reference to FIG. 1, the service provider computers implementing the district generation features may utilize the barrier geospatial vector data and the identified barriers to generate a barrier-aware road graph. Penalties for crossing each barrier (204-210) may be assigned by the service provider computers depending on the type of barrier and/or the location of each barrier within the geographical area 200. The penalties assigned to each barrier 204-210 may be used by the service provider computers when implementing a bounded Voronoi algorithm that uses a raster cost allocation method as described below in more detail with reference to FIGS. 7 and 8. In accordance with at least one embodiment, the barrier geospatial vector data for the geographical area 200 may be updated based on updates to the barriers 204-210 such as the addition or removal of railways (e.g., 204) or highways (e.g., 210). The resulting changes to the barrier geospatial vector data for the geographical area 200 may result in different districts being generated for the geographical area 200 using the district generation features described herein.

Figure 3:
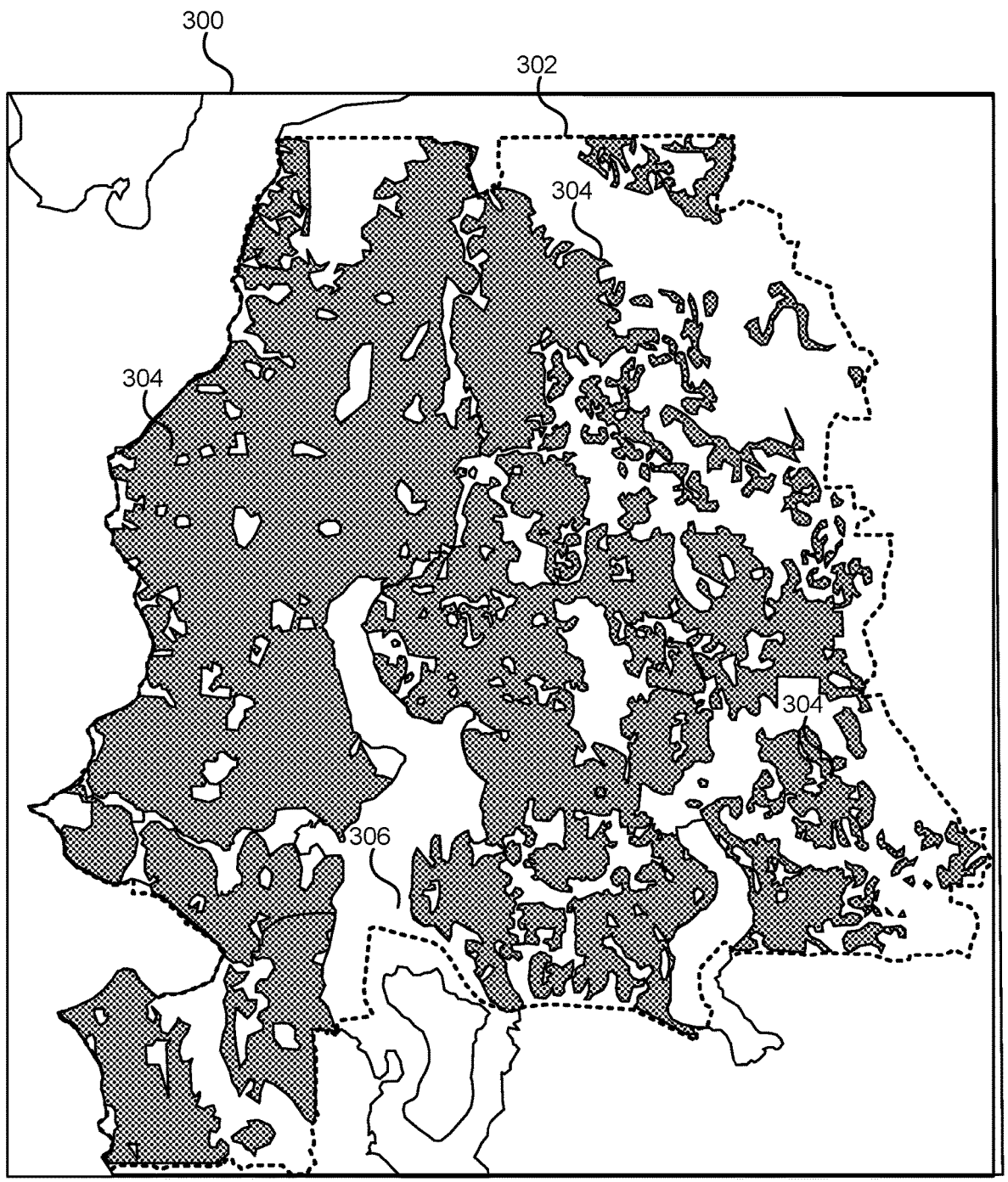
FIG. 3 illustrates an example representation of historical delivery demand data for a geographical area for use in a district generation feature, in accordance with at least one embodiment.

FIG. 3 illustrates an example representation of historical delivery demand data for a geographical area for use in a district generation feature, in accordance with at least one embodiment. The example representation of the historical delivery demand data for the geographical area 300 includes boundaries 302 for the geographical area 300 as well as a plurality of data points 304 that represent customer demand density, population counts, or population density data for the geographical area 300. As is illustrated in FIG. 3, no historical delivery demand data is represented for areas such as bodies of water 306. The historical delivery demand data may be obtained based on historical deliveries to customers, users, or locations within the geographical area 300 from various sources, such as online marketplaces. The historical delivery demand data may also be derived from sources such as governmental data sources and include customer demand data associated with an online marketplace, population estimates and geographical census information, traffic patterns, pedestrian footprint data, and electricity usage obtained from publicly available data sources. In embodiments, the example representation of historical delivery demand data for the geographical area 300 represents an example demand distribution for the geographical area 300.

In accordance with at least one embodiment, the service provider computers may determine a spatial distribution of data points from the historical delivery demand data for the geographical area using a stratified sampling algorithm. For example, the stratified sample algorithm may represent a stratified sample of reference data points from the spatial distribution of data points for the geographical area 300. By utilizing such an algorithm, a data size of 500,000 or more data points may be reduced to a manageable size of 5000 to 10000 data points for the geographical area 300. In embodiments, the reference data points from the spatial distribution of data points may be used by the service provider computers to generate clusters of the spatially sampled points that are constrained by cluster size (number of data points) and by barriers. For example, the service provider computers may utilize a capacitated K-means algorithm that uses a barrier-penalized constraint based on the barrier-aware road graph and constraints associated with demand volume to generate the clusters of the data points. In embodiments, each cluster corresponds to a district within the geographical area 300.

The capacitated K-means algorithm implemented by the service provider computers uses a network distance and applies a penalty to the distance if a barrier exists between a centroid and a point to minimize the sum of the squared Euclidean distance between centroids and the points in each cluster. The service provider computers also utilize constraints such as a minimum and maximum size for each cluster. In embodiments, the service provider computers may iteratively invoke the capacitated K-means algorithm until an optimal solution is found (e.g., no significant reduction in the assignment cost is obtained after updating the centroids), upon expiration of a certain time period (predefined maximum run time), or no improvements to the assignment cost is obtained after a predefined maximum number of iterations. In accordance with at least one embodiment, the capacitated K-means algorithm implemented by the service provider computers sets K to the number of districts required, which is an input parameter and user defined. The invoked capacitated K-means algorithm balances demand across the districts by estimating an expected demand per district v=n/|K| and then defines a configurable parameter that represents an acceptable deviation ±η from v to specify a maximum $v^+$ and a minimum $v^-$ number of sample data points to be assigned to each district. Let I be the set of sample data points. Decision variable $x_{ik}$ is 1 if a data point i is assigned to district k and 0 otherwise. Utilizing cluster centers $C^{1,t}, C^{2,t}, \ldots, C^{K,t}$ at iteration t, the algorithm computes the lowest-cost assignment of points to cluster centers per an integer programming model and updates centroids for the clusters $C^{1,t+1}, C^{2,t+1}, \ldots, C^{K,t+1}$ for next iteration t+1.

The integer programming model implemented by the service provider computers minimizes the assignment cost (shortest-path squared distance plus barrier penalty) of data points to centroids along the barrier-aware road graph. The shortest-path network distance with penalties is denoted by networkdist(x,$C^r$):

$$\text{minimize } \sum_{i=1}^{I} \sum_{k=1}^{K} x_{i,k} \cdot networkdist(x^i, C^{k,t})^2$$

subject to $$\sum_{i=1}^{I} x_{i,k} \geq v^- \ \forall \ k \in K \quad (1)$$

$$\sum_{i=1}^{I} x_{i,k} \leq v^+ \ \forall \ k \in K \quad (2)$$

-continued $$\sum_{k=1}^{K} x_{i,k} = 1 \ \forall \ i \in I \quad (3)$$

$$x_{i,k} \in \{0, 1\} \ \forall \ i \in I, \forall \ k \in K \quad (4)$$

Constraints (1) and (2) guarantee a minimum and maximum demand volume per cluster. Constraint (3) ensures that all data points are assigned to a unique cluster, and constraints (4) are integrality constraints. The service provider computers invoke the K-means++ algorithm using the spatial sampled data for the initial set of K centroids $C^{1,t}$, $C^{2,0}, \ldots, C^{K,0}$. The K-means++ algorithm is used to design the initial values for the capacitated K-means algorithm. The service provider computers for all subsequent iterations re-computes and updates the centroids based on a new solution based on the integer programming model, computing the updated centroids, $C^{K, t+1}$, as the mean of all points assigned to cluster k. The clusters of data points for the geographical area are then utilized to generate concave hull polygons, as is described in more detail with reference to FIG. 5.

Figure 4:
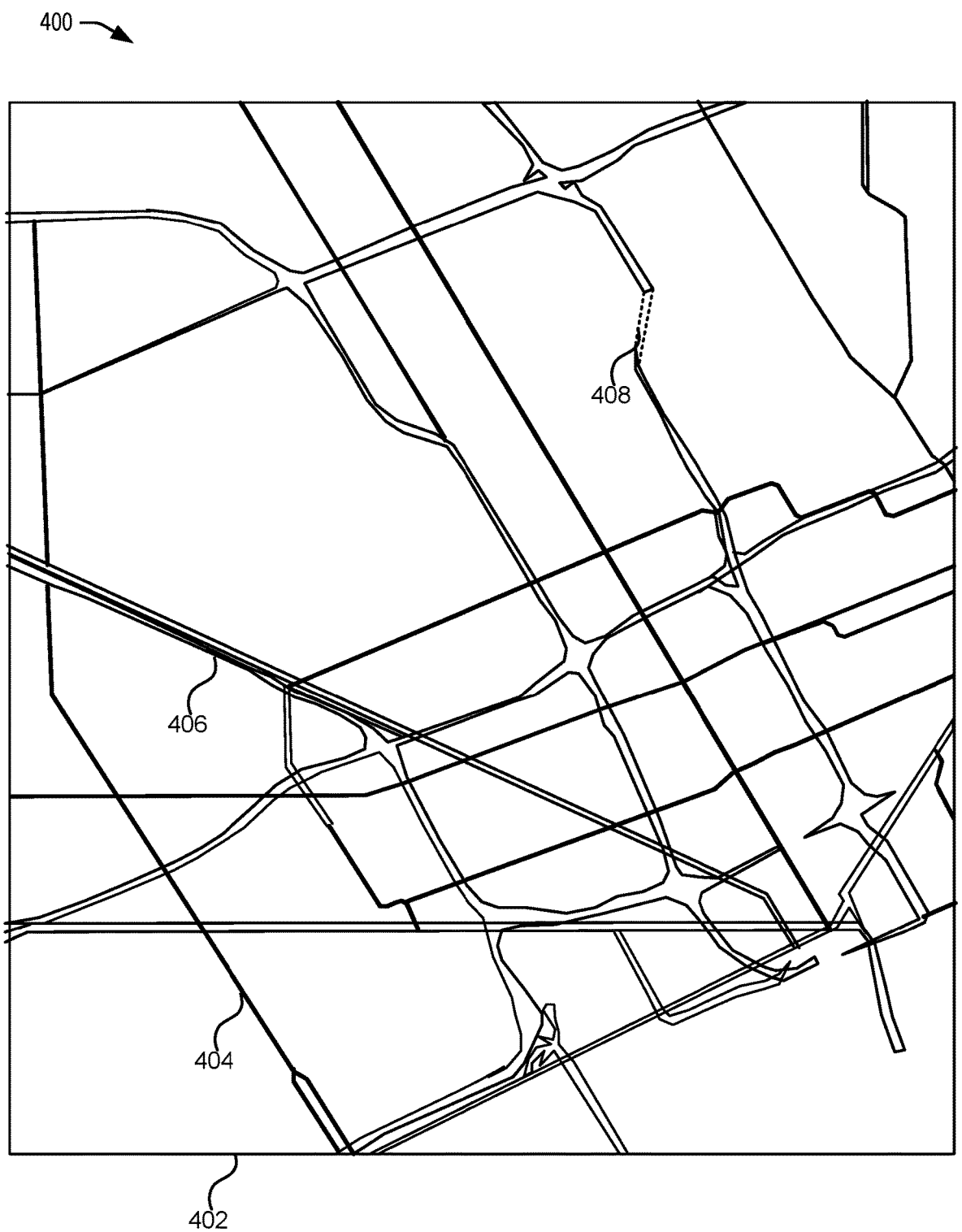
FIG. 4 illustrates an example representation of road infrastructure data for a geographical area for use in a district generation feature, in accordance with at least one embodiment.

FIG. 4 illustrates an example representation of road infrastructure data for a geographical area for use in a district generation feature, in accordance with at least one embodiment. FIG. 4 depicts an example representation 400 of road infrastructure data 402 for a geographical area. In embodiments, the road infrastructure data 402 includes road network data from a Road Segment Model (RSM) using all drivable road classes. The road infrastructure data 402 includes and identifies all road classes for the road network data of the geographical area. For example, major highways may be associated with road classes 10, 20, and 30 which are used as infrastructure barriers, and all other road classes are used for distance calculations (such as when generating the barrier-aware road graph).

The road classes may be associated with a type of road included in the geographical area. FIG. 4 depicts different types of road classes 404-408 which are represented in FIG. 4 as different types of lines (varying weights or sizes of the lines). For example, roads 404 may correspond to double lane streets, whereas roads 406 may correspond to major highways, and road 408 corresponds to a minor road. The service provider computers implementing the district generation feature may assign penalties to the roads in the road infrastructure data 402 depending on the type of road class associated with each road. For example, road classes 10-20 (which may be associated with major highways) may be assigned the highest penalty, whereas classes 30-60 (which may be associated with larger roads that are not major highways) are assigned progressively lower penalties, and classes ≥60 have a penalty of 0 (which may correspond to minor roads or streets). Any road segments in the road infrastructure data 402 that intersect with a non-road or natural barrier are also assigned the highest penalty.

Figure 5:
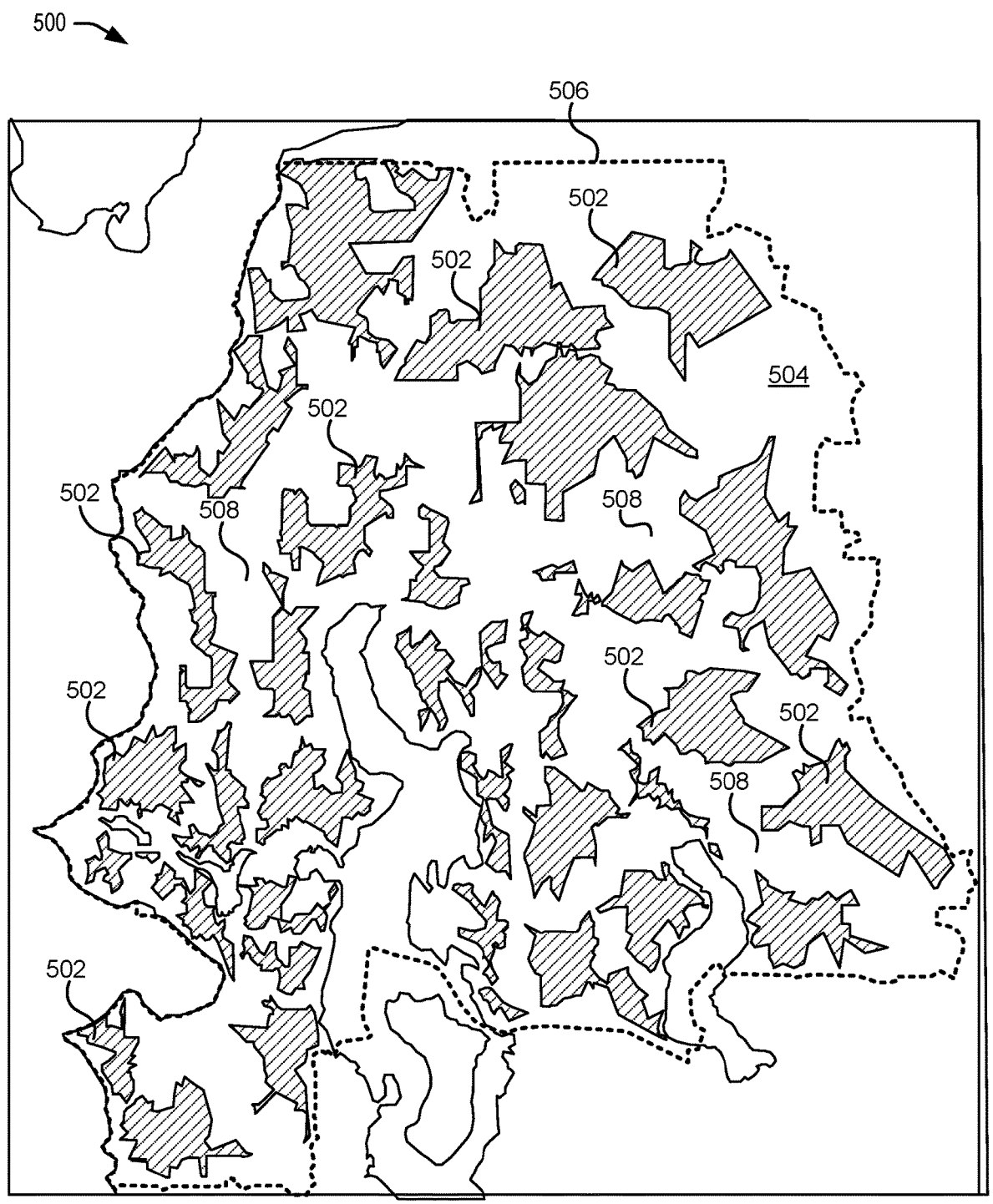
FIG. 5 illustrates an example representation of polygons generated for a geographical area using a concave hull algorithm in a district generation feature, in accordance with at least one embodiment.

FIG. 5 illustrates an example representation 500 of polygons generated for a geographical area using a concave hull algorithm in a district generation feature, in accordance with at least one embodiment. FIG. 5 depicts polygons 502 (concave hull polygons) generated by the service provider computers implementing the district generation features. The polygons 502 may be used as seeds or as starting polygons for dividing the geographical area 504 (denoted by dashed line borders 506) into districts. In accordance with at least one embodiment, the service provider computers may generate the polygons 502 (first set of polygons) by implementing a concave hull algorithm that uses the plurality of cluster data points generated from the spatial distribution of demand data for the geographical area 504 as discussed above with reference to FIG. 3. A concave hull algorithm includes an algorithm for generating a bounding polygon around a set of points (e.g., clusters of data points).

In embodiments, the concave hull algorithm utilizes a parameter α that controls the complexity of the shape of the polygon, such that an edge of a disk of radius 1/α can be drawn between any two edge members of a set of points and still contain all the points of the cluster. An example of a concave hull polygon with α=0 is a convex hull polygon, and as the a parameter value is increased, the bounding shape of the polygon will begin to fit the cluster of data points with a more tightly fitting bounding polygon. In embodiments, the polygons 502 serve as a skeleton polygon for outlining the districts for the geographical area 504. As described herein, other algorithms are implemented which utilize the polygons 502 to ensure that the final polygons (district polygons) do not overlap and are fully contained within hard barriers. As is depicted in FIG. 5, the polygons 502 are not contiguous and do not cover the entirety of geographical area 504. As such, gaps 508 exist between polygons 502 which require filling to ensure proper coverage, as well as contiguous polygons that divide geographical area 504 into districts. The service provider computers implementing the district generation features may utilize a number of algorithms to fill the gaps to generate districts to divide the geographical area 504 that are not only barrier aware but also road network aware.

Figure 6:
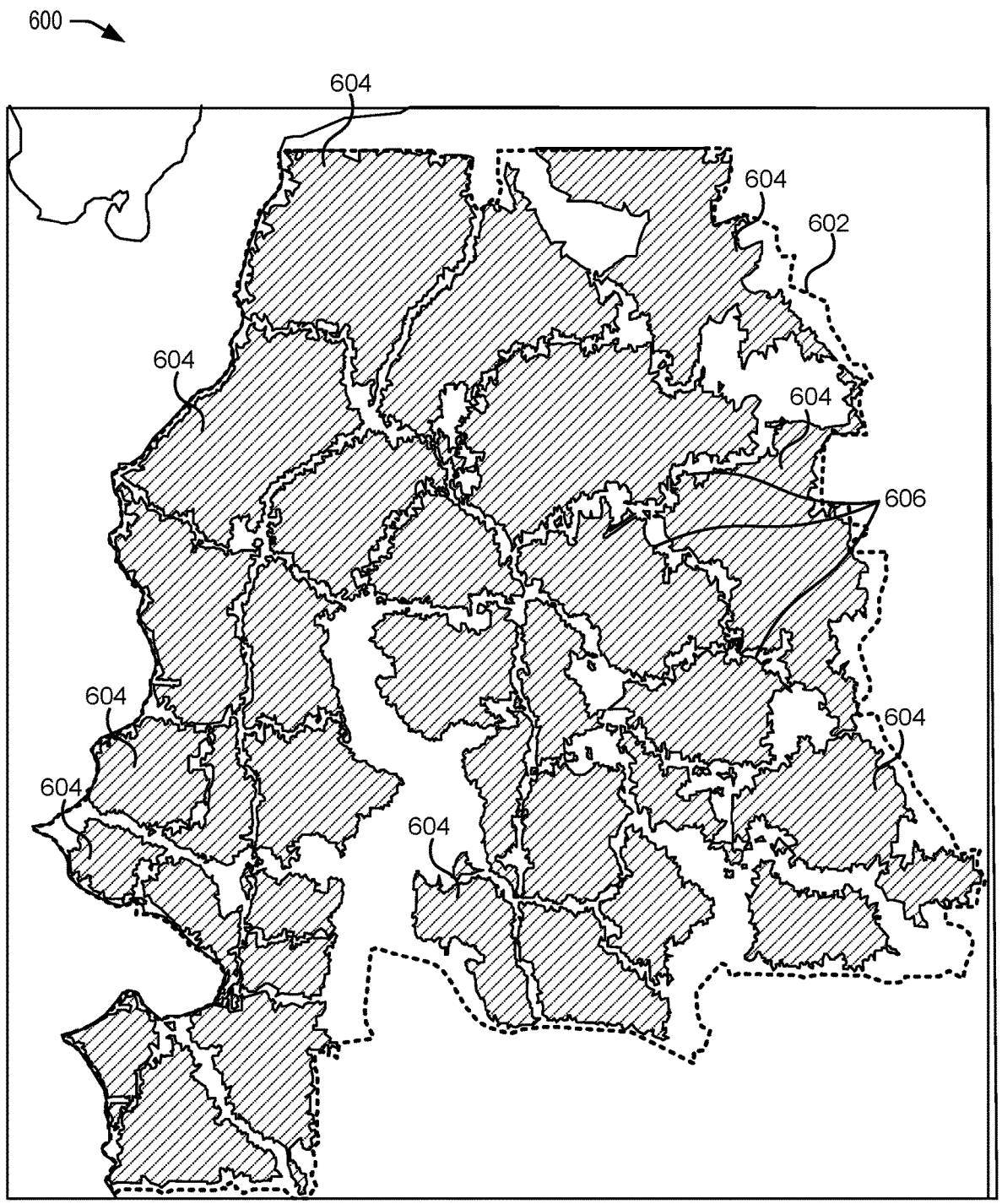
FIG. 6 illustrates an example representation of polygons generated for a geographical area using a barrier constrained network Voronoi algorithm that uses the polygons generated from the concave hull algorithm as seeds in a district generation feature, in accordance with at least one embodiment.

FIG. 6 illustrates an example representation 600 of polygons generated for a geographical area 602 (denoted by the dashed lines) using a barrier constrained network Voronoi algorithm that uses the polygons generated from the concave hull algorithm as seeds in a district generation feature, in accordance with at least one embodiment. The service provider computers implementing the district generation features may utilize the concave hulls (e.g., the first set of polygons from FIG. 5) as seeds for Voronoi tessellation as part of the barrier constrained network Voronoi algorithm to generate polygons 604. In embodiments, the barrier constrained network Voronoi algorithm partitions the barrier-aware road graph of the geographical area into subgraphs that each represent a district. The barrier constrained network Voronoi algorithm includes an algorithm that is a tessellation of a network graph into n sub-networks associated with n generators or seeds in such a way that every node in the graph is assigned to the nearest generator.

The barrier constrained network Voronoi algorithm is a variation of the network Voronoi algorithm where the Voronoi polygons are constrained from crossing barriers. In embodiments, the barrier constrained network Voronoi algorithm uses the barrier-aware road graph generated using the road infrastructure data and the barrier geospatial vector data from the geographical area (FIG. 4). The weights of each edge of the barrier-aware road graph are set equal to the driving distance of the road segment plus a penalty. The penalty is determined based on the road class associated with the road segment. For example, road classes 10-20 are assigned the highest penalties. As described before, the concave hulls generated by the concave hull algorithm are used as the seeds for the Voronoi tessellation. The service provider computers identify all nodes of the road graph (intersections) that fall within each concave hull polygon using a spatial join. The barrier constrained network Voronoi algorithm then partitions the road graph using the nodes to determine a mapping of each node in the graph to the nearest (least cost) seed node along the weighted graph edges. The barrier constrained network Voronoi algorithm implemented by the service provider computers generates network Voronoi polygons that do not cross hard barriers as well as respect various tiers of minor barriers (e.g., lower granularity road classes). In embodiments, the barrier constrained network Voronoi algorithm generates LineStrings which are converted to polygons using a similar concave hull algorithm described for FIG. 5 around each district sub-graph to arrive at the polygons 604 of FIG. 6. However, as depicted in FIG. 6, some gaps 606 still exist between polygons 604. The gaps may correspond to major highways or other barriers, which may result in non-road aware polygons. The service provider computers implementing the district generation features may utilize other algorithms to fill the gaps present in FIG. 6.

Figure 7:
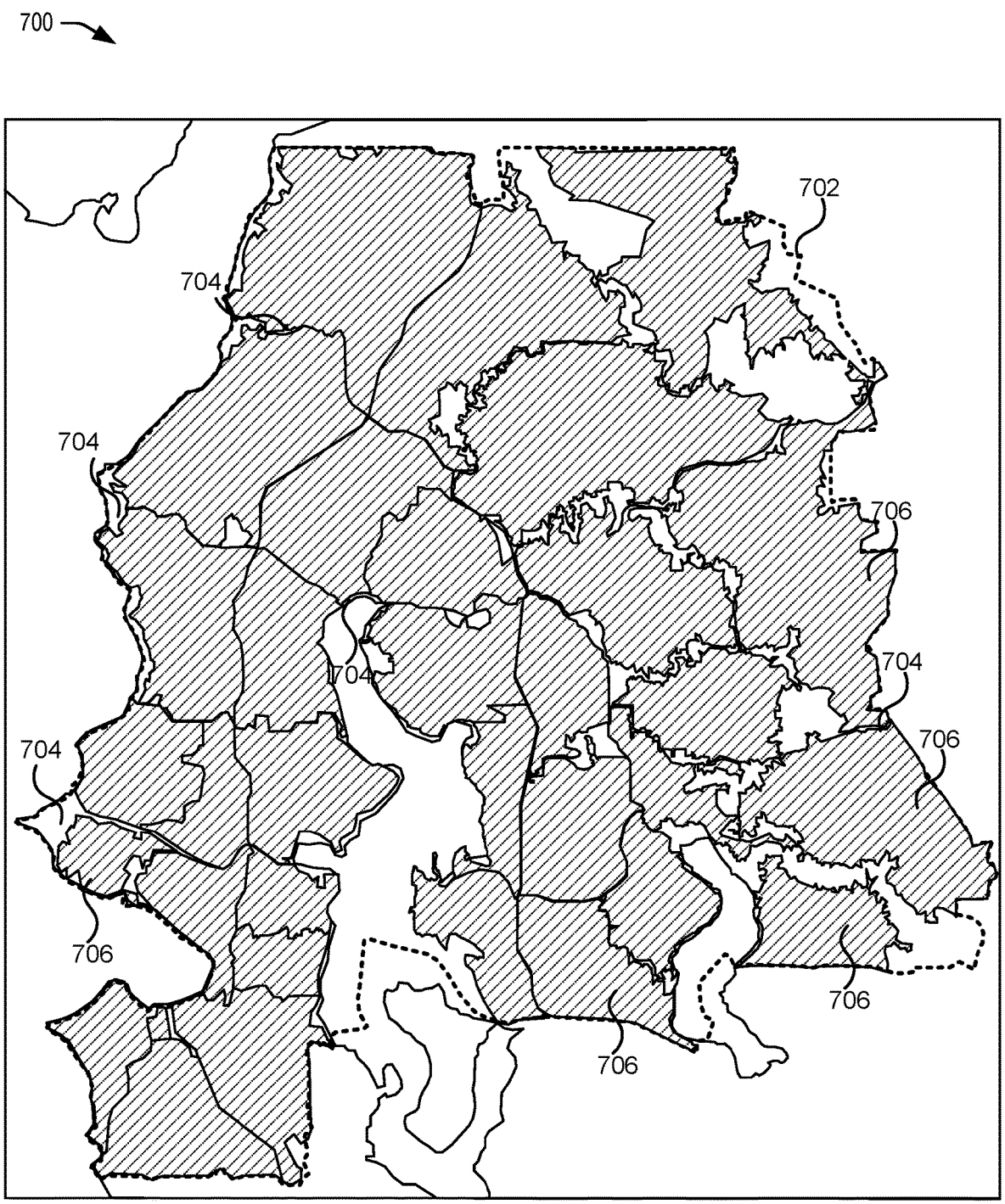
FIG. 7 illustrates an example representation of the expansion of the polygons for a geographical area snapped to nearby polygons generated around road areas that were generated using a Geoatom algorithm in a district generation feature, in accordance with at least one embodiment.

FIG. 7 illustrates an example representation 700 of the expansion of the polygons for a geographical area 702 snapped to nearby polygons generated around road areas that were generated using a Geoatom algorithm in a district generation feature, in accordance with at least one embodiment. In embodiments, the service provider computers implementing the district generation feature may utilize a Geoatom algorithm to generate a set of polygons that correspond to a hierarchy of Geoatom polygon families using the road infrastructure data and the barrier geospatial vector data for the geographical area 702. The Geoatoms generated by the Geoatom algorithm spatially discretize any bounded polygon based on underlying road and natural features (barriers). Geoatoms may refer to the smallest area delimited by a set of street crossings to encode key delivery information for the geographical area 702. In urban areas, this may correspond to a city block or similar census blocks in the U.S. In embodiments, the service provider computers utilize the hierarchy of Geoatom polygon families to convert the polygons generated by the barrier constrained network Voronoi algorithm (FIG. 6) to their final district polygons (districts).

To properly generate the hierarchy of Geoatom polygon families for the geographical area 702 the service provider computers may utilize an algorithm to artificially introduce roads in areas of the geographical area 702 that do not have enough roads to create a convex Geoatom polygon. Such areas are typically found near shorelines and lakes and result in the creation of long elongated polygons by the barrier constrained network Voronoi algorithm due to insufficient road intersections. The algorithm implemented by the service provider computers uses the barrier geospatial vector data for the geographical area 702 to find the nearest nodes in the barrier-aware road graph to the shorelines and build artificial roads between the nodes and the shorelines. The artificial roads generated by the algorithm will be used by the Geoatom algorithm to split a long-elongated polygon into compact sub-polygons for hierarchal assignment in the hierarchy of Geoatom polygon families.

In embodiments, the service provider computers may utilize the hierarchy of Geoatom polygon families to navigate from one polygon to other polygons through established indexes. In embodiments, the Geoatom algorithm generates the hierarchy of Geoatom polygon families using the road infrastructure data (including the road classes) and the barrier geospatial vector data for the geographical area 702. The hierarchy of the Geoatom polygon families is defined by starting with only high capacity road classes (e.g., 10, 20, and 30) as the top tier, and then incrementing to the next granularity of road class in each level down (e.g., [10, 20, 30], [10, 20, 30, 40] . . . [10, 20, 30, 40, 50, 60, 70, 80, 90]). At each level, every Geoatom polygon is associated with its parent from the next higher hierarchy. Once the hierarchy of Geoatom polygon families is generated for the geographical area 702, the service provider computers may utilize an algorithm which is iteratively invoked to snap the Geoatom polygons at various hierarchies to the polygons generated from the barrier constrained network Voronoi algorithm (FIG. 6).

The iterative invocation of this algorithm may occur over a fixed number of iterations to create a complete road-network polygon set. The algorithm begins at the top of the hierarchy (e.g., Geoatom polygons created only by major roads (road classes 10, 20, and 30). If the algorithm identifies that a given Geoatom polygon overlaps with only a single polygon generated from the barrier constrained network Voronoi algorithm, the Geoatom polygon is snapped to that polygon, thereby growing the district by snapping the Geoatom polygon to it (e.g., merging the polygon from the barrier constrained network Voronoi algorithm to the Geoatom polygon into a single shape). If no such overlap is found, the algorithm traverses the hierarchy to the next Geoatom family level and repeats this over the pre-defined hierarchy. If the algorithm is invoked and traverses the family without finding a complete overlap between the polygons, unassigned Geoatom polygons will be merged into the nearest polygon generated from the barrier constrained network Voronoi algorithm based on road-network distance. As depicted in FIG. 7, several gaps 704 may still exist between the polygons 706 generated using the Geoatom algorithm. The service provider computers may utilize another algorithm and a raster cost allocation method (described below with reference to FIG. 8) to fill the gaps 704 and generate the final district polygons for the geographical area 702.

Figure 8:
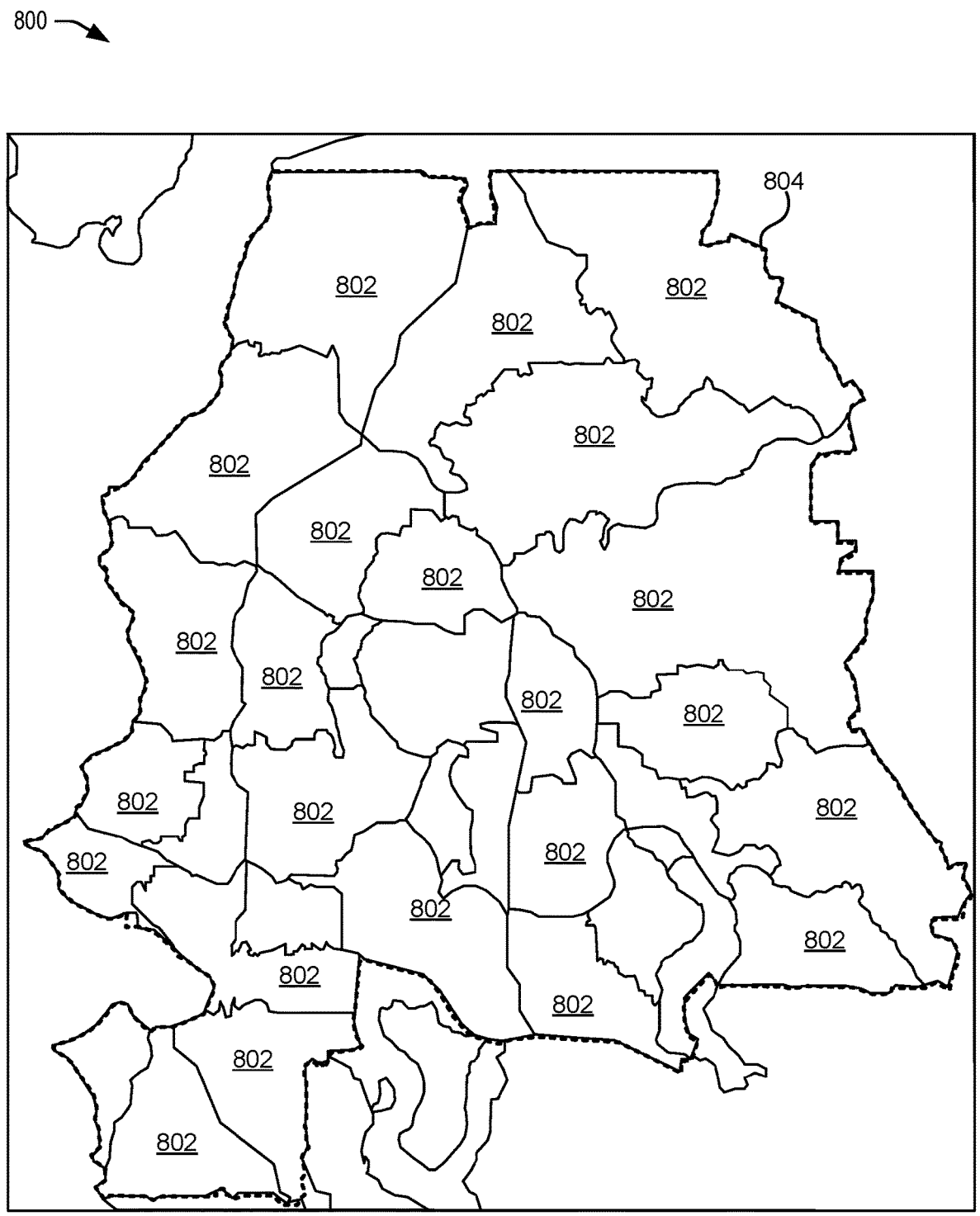
FIG. 8 illustrates an example representation of final districts generated for a geographical area in a district generation feature using a bounded Voronoi algorithm that uses a raster cost allocation, in accordance with at least one embodiment.

FIG. 8 illustrates an example representation 800 of final districts 802 generated for a geographical area 804 in a district generation feature using a bounded Voronoi algorithm that uses a raster cost allocation, in accordance with at least one embodiment. Although FIG. 8 depicts a number of districts 802 generated for the geographical area 804 the district generation feature described herein may determine more or less districts for the geographical area 804. In embodiments, the service provider computers implementing the district generation features may utilize a bounded Voronoi algorithm that uses a cost allocation based on barrier penalties from the barrier geospatial vector data to fill the gaps between the polygons resulting from the Geoatom algorithm process and the snapping algorithm described above with reference to FIG. 7. The bounded Voronoi algorithm generates a raster cost grid of the geographical area 804 in which pixels that contain a barrier have a cost of 1000 and all other pixels have a cost of 1. On a raster grid of equivalent size to the raster cost grid, seed points are mapped, which correspond to raster cells that fall within a polygon generated from the Geoatom algorithm process and snapping algorithm. The service provider computers implementing the bounded Voronoi algorithm then determine a cost allocation raster by assigning each cell to its nearest seed cell based on the least cumulative cost over the cost surface.

In tables 1-4 below, A and B are seed points, and the cost to traverse each pixel in the raster cost map is defined in the cost raster. Given the two inputs of seed points A and B, the raster-based cost allocation algorithm (cost allocation raster) determines the least cost to and from each cell to the nearest seed point (A or B), displayed in least cumulative cost, and allocates each cell to the nearest seed point as displayed in cost allocation.

TABLE 1 seed points

| | | | | | | | | | |
|---|---|---|---|---|---|---|---|---|---|
| A | | | | | | | | | |
| | | | | | | | | | |
| | | | | | | | | | |
| | | | | | B | | | | |
| | | | | | | | | | |
| | | | | | | | | | |

TABLE 2 cost raster

| | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1000 | 1000 | 1000 | 1000 |
| 1 | 1 | 1 | 1 | 1 | 1000 | 1000 | 1 | 1 | 1 |
| 1 | 1 | 1000 | 1000 | 1000 | 1 | 1 | 1 | 1 | 1 |
| 1 | 1000 | 1000 | 1 | 1 | 1 | 1 | 1 | 1 | 1 |
| 1000 | 1000 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

TABLE 3 least cumulative cost

| | | | | | | | | | |
|---|---|---|---|---|---|---|---|---|---|
| 2 | 1 | 0 | 1 | 2 | 3 | 4 | 5 | 6 | 7 |
| 2 | 1 | 1 | 1 | 2 | 3 | 4 | 5 | 6 | 7 |
| 2 | 2 | 2 | 2 | 2 | 3 | 4 | 5 | 6 | 7 |
| 2 | 2 | 2 | 2 | 2 | 3 | 1004 | 1004 | 1004 | 1004 |
| 3 | 3 | 3 | 3 | 3 | 1003 | 1003 | 4 | 4 | 4 |
| 4 | 4 | 4 | 1003 | 1002 | 1002 | 3 | 3 | 3 | 3 |
| 5 | 5 | 1004 | 1003 | 2 | 2 | 2 | 2 | 2 | 3 |
| 5 | 1005 | 1004 | 3 | 2 | 1 | 1 | 1 | 2 | 3 |
| 1005 | 1005 | 4 | 3 | 2 | 1 | 0 | 1 | 2 | 3 |
| 6 | 5 | 4 | 3 | 2 | 1 | 1 | 1 | 2 | 3 |
| 6 | 5 | 4 | 3 | 2 | 2 | 2 | 2 | 2 | 3 |

TABLE 4 cost allocation

| | | | | | | | | | |
|---|---|---|---|---|---|---|---|---|---|
| A | A | A | A | A | A | A | A | A | A |
| A | A | A | A | A | A | A | A | A | A |
| A | A | A | A | A | A | A | B | B | B |
| A | A | A | A | A | A | B | B | B | B |
| A | A | A | A | B | B | B | B | B | B |
| A | A | A | B | B | B | B | B | B | B |
| A | A | B | B | B | B | B | B | B | B |
| A | B | B | B | B | B | B | B | B | B |
| B | B | B | B | B | B | B | B | B | B |
| B | B | B | B | B | B | B | B | B | B |

In embodiments, the heavy penalty for barriers on the cost raster ensures that regions will not cross barriers unless absolutely required. The service provider computers may then, using the raster-based cost allocation algorithm (cost allocation raster) and the bounded Voronoi algorithm, convert the cost allocation raster to vectorized polygons that are smoothed to result in the districts 802. The bounded Voronoi algorithm and cost allocation raster generate barrier aware and road network aware polygons that form the districts 802 that divide the geographical area 804. The polygons that form districts 802 can be of complex shapes and account for complex barriers, both linear and polygon barriers, and allow and are road aware, which results in very little cleaning within a resultant Shapefile that includes the polygons which represent districts 802 and/or coordinates for districts 802 in geographical area 804. The pixels of the raster cost map that correspond to gaps may be appropriately covered by the polygons that form districts 802 such that a smooth surface that covers the entirety of the geographic area 804 with no holes or gaps is achieved.

FIGS. 9A, 9B, 10A, and 10B illustrate example flow charts for district generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

Figure 9A:
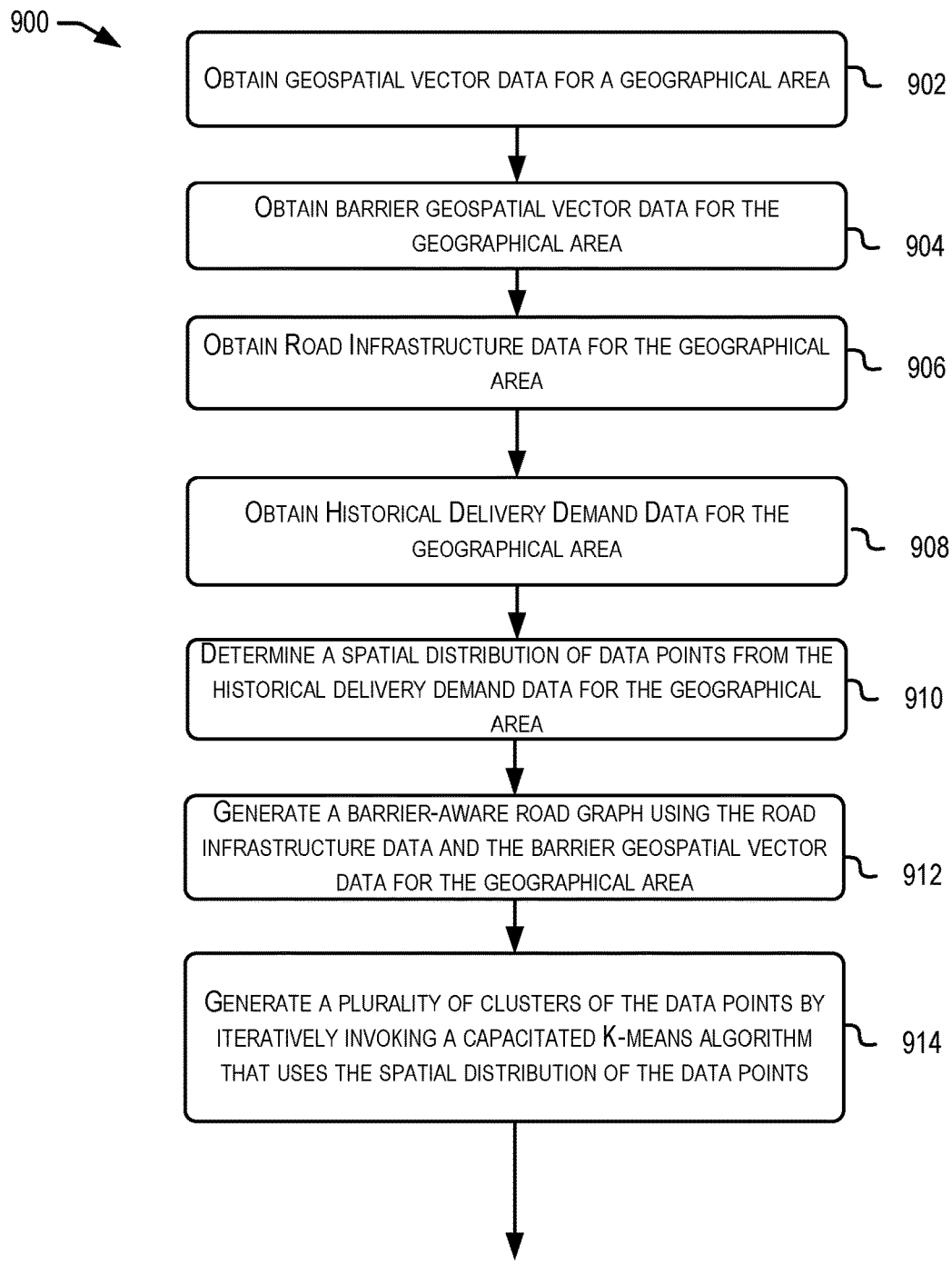
FIG. 9A illustrates an example flow chart for a district generation feature, in accordance with at least one embodiment.
Figure 9B:
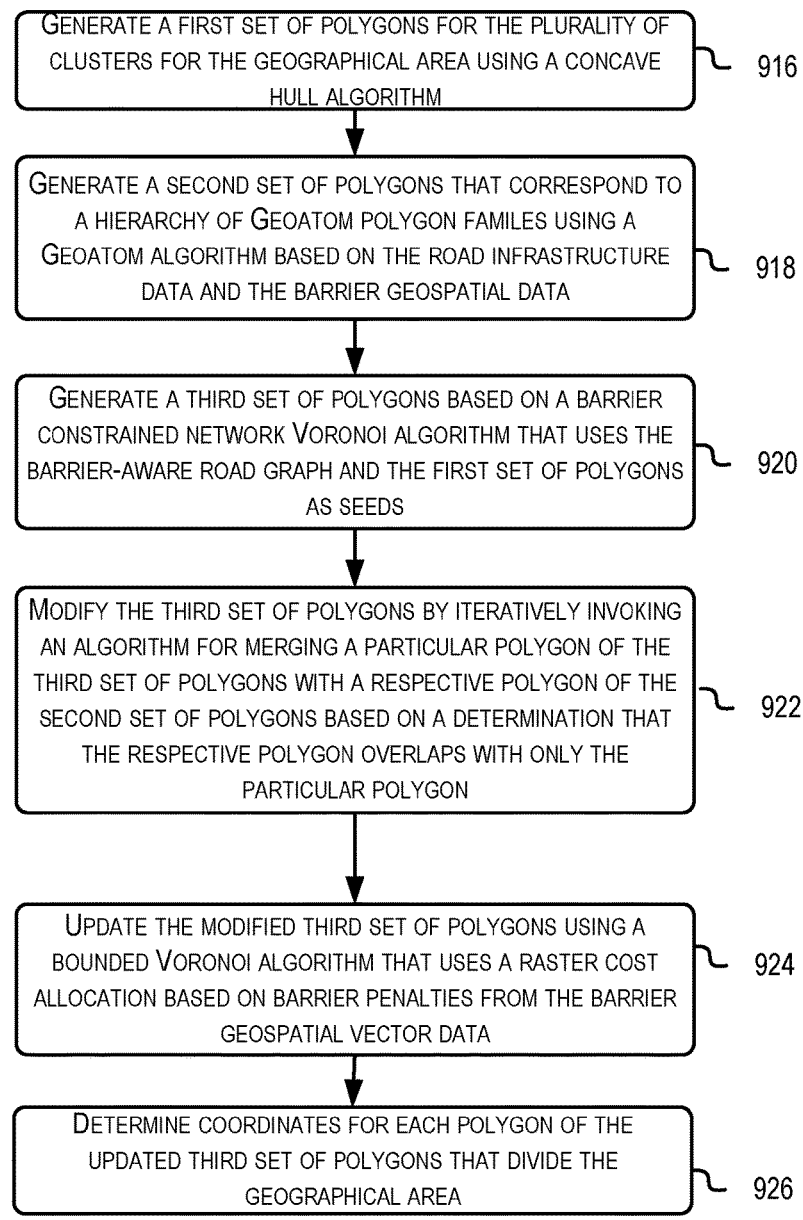
FIG. 9B illustrates an example flow chart for a district generation feature, in accordance with at least one embodiment.
Figure 10A:
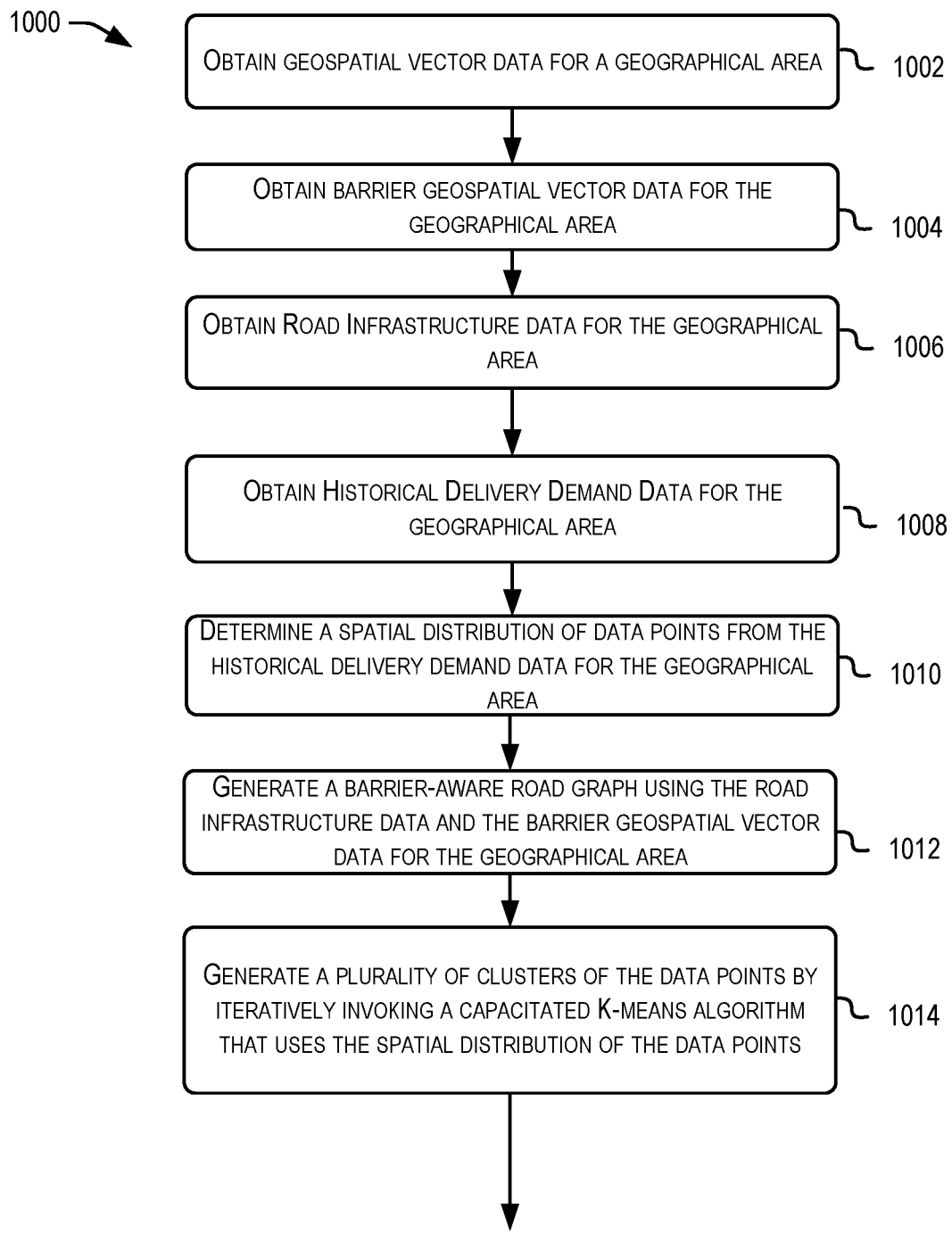
FIG. 10A illustrates an example flow chart for a district generation feature, in accordance with at least one embodiment.
Figure 10B:
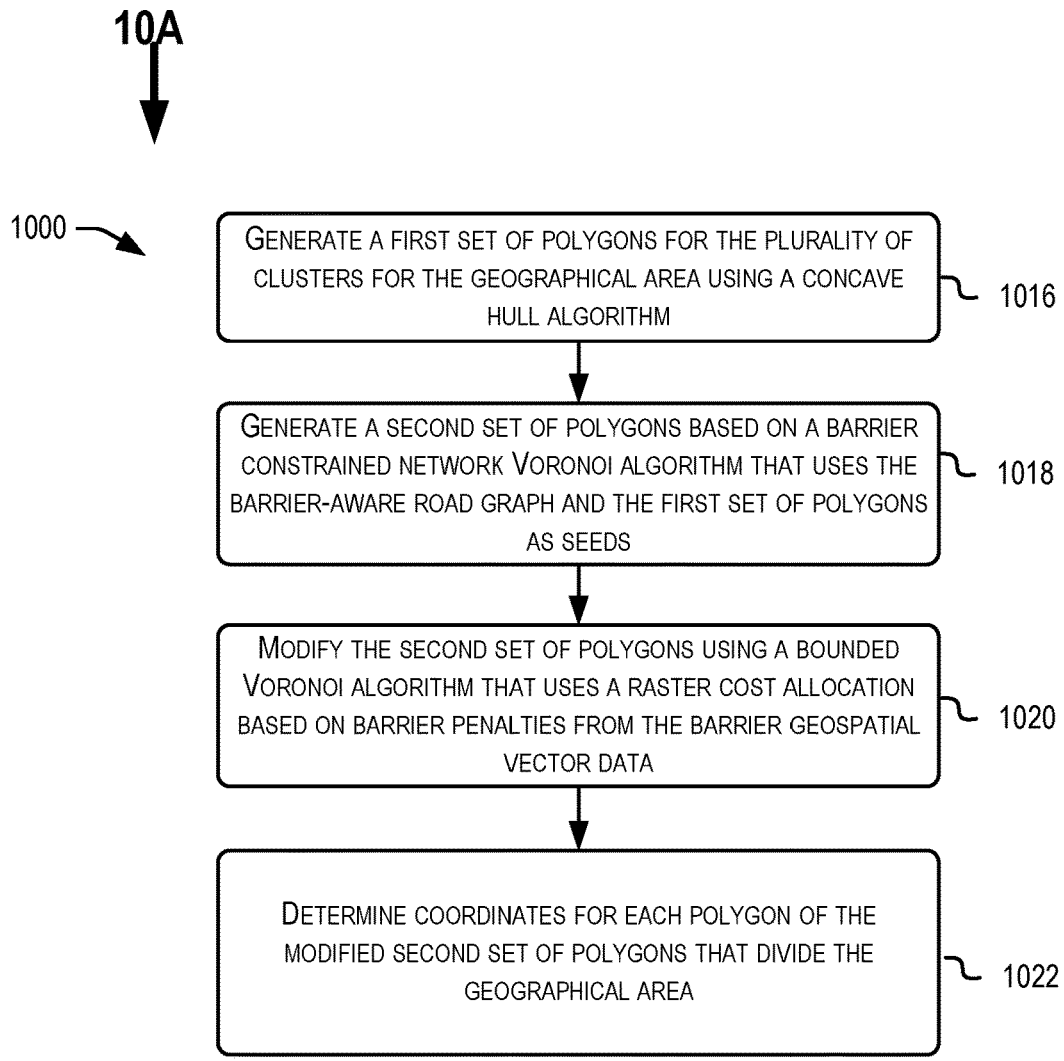
FIG. 10B illustrates an example flow chart for a district generation feature, in accordance with at least one embodiment.
Figure 11:
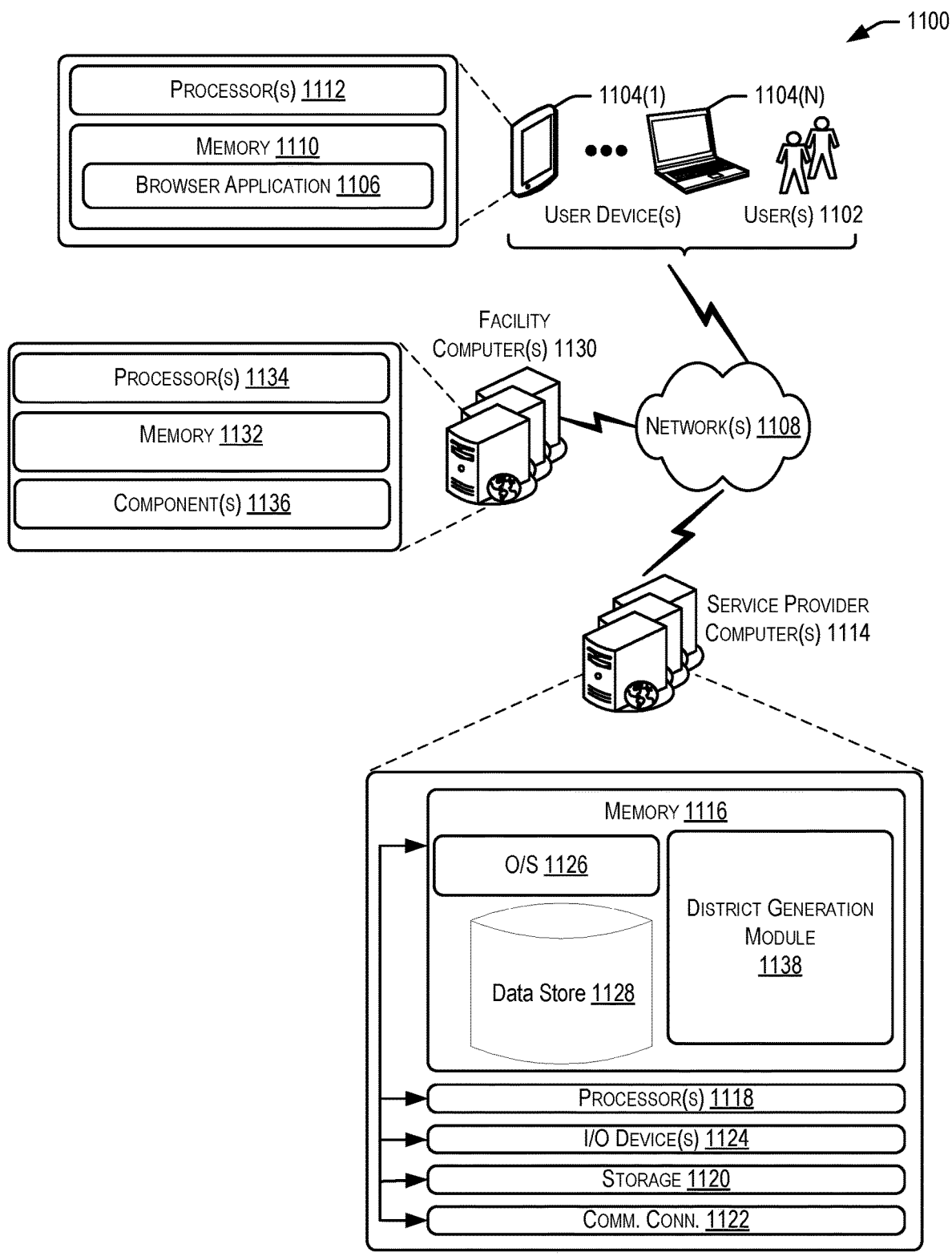
FIG. 11 illustrates an example architecture for a district generation feature that includes one or more service provider computers, a user device, and one or more facility computers in accordance with at least one embodiment.

In some examples, service provider computers (service provider computers 1114) utilizing at least the district generation module 1138 depicted in FIG. 11 may perform the processes 900 and 1000 of FIGS. 9A, 9B, 10A, and 10B. In FIGS. 9A and 9B, the process 900 may include obtaining geospatial vector data for a geographical area at 902. In embodiments, the geospatial vector data may include boundary coordinates for the geographical area in which the districts will be determined using the district generation feature. The process 900 may include obtaining barrier geospatial vector data for the geographical area at 904. In embodiments, the barrier geospatial vector data may include railway and natural barrier data that includes rivers, large water bodies, coastlines, and parks. The process 900 may include obtaining road infrastructure data for the geographical area at 906. In accordance with at least one embodiment, the road infrastructure data may include road classes that are assigned to each type of road included in the road infrastructure data. For example, major highways may correspond to road classes 10, 20, and 30, whereas small gravel roads may correspond to road classes 80 and 90. In embodiments, the road classes may be associated with road characteristics such as a type of road, size of the road, or material composition of the road. The process 900 may include obtaining historical delivery demand data for the geographical area at 908. In embodiments, the historical delivery demand data may include population counts or population density for the geographical area derived from publicly available data sources.

In embodiments, other data points such as regulatory constraint information and user-specified input may be obtained or received for determining the districts for the geographical area. The regulatory constraint information may include local regulatory constraints such as coordinates for low-emission zones, user specified districts such as coordinates which correspond to university campuses, exclusion zones such as military bases or government buildings, and existing district coordinates for the geographical area. The user-specified input may include an identification of a number of districts to be generated for the geographical area specified by a user such as an entity associated with the service provider computers implementing the district generation features described herein. The process 900 may include determining a spatial distribution of data points from the historical delivery demand data for the geographical area at 910. The spatial distribution of data points from the historical delivery demand data may be determined using a stratified sampling algorithm. The process 900 may include generating a barrier-aware road graph using the road infrastructure data and the barrier geospatial vector data for the geographical area at 912. The process 900 may include generating a plurality of clusters of the data points by iteratively invoking a capacitated K-means algorithm that uses the spatial distribution of the data points at 914. In accordance with at least one embodiment, the capacitated K-means algorithm uses a barrier-penalized constraint based on the barrier-aware road graph and constraints associated with demand volume for each cluster of the plurality of clusters. The constraints associated with the demand volume may include a maximum demand volume and a minimum demand volume, which may be user specified or pre-defined.

The process 900 may include generating a first set of polygons for the plurality of clusters for the geographical area using a concave hull algorithm at 916. Each polygon of the first set of polygons may correspond to a unique cluster of the plurality of clusters. The process 900 may include generating a second set of polygons that correspond to a hierarchy of Geoatom polygon families using a Geoatom algorithm based on the road infrastructure data and the barrier geospatial data at 918. The process 900 may include generating a third set of polygons based on a barrier constrained network Voronoi algorithm that uses the barrier-aware road graph and the first set of polygons as seeds at 920. The process 900 may include modifying the third set of polygons by iteratively invoking an algorithm for merging a particular polygon from the third set of polygons with a respective polygon from the second set of polygons based on a determination that the respective polygon overlaps with only the particular polygon at 922. The process 900 may include updating the modified third set of polygons using a bounded Voronoi algorithm that uses a raster cost allocation based on barrier penalties from the barrier geospatial vector data at 924. The process 900 may include determining coordinates for each polygon of the updated third set of polygons that divide the geographical area at 926. In embodiments, the service provider computers may generate and transmit instructions for an actuator of a component of a delivery station or facility upon determining the coordinates for each polygon in the geographical area. The instructions may be configured to activate or otherwise cause the actuator of the component to divert or transport a portion of packages from a first area in the facility to another facility based on the determined districts for the geographical area.

The process 1000 of FIGS. 10A and 10B may include obtaining geospatial vector data for a geographical area at 1002. The process 1000 may include obtaining barrier geospatial vector data for the geographical area at 1004. The process 1000 may include obtaining road infrastructure data for the geographical area at 1006. The process 1000 may include obtaining historical delivery demand data for the geographical area at 1008. The process 1000 may include determining a spatial distribution of data points from the historical delivery demand data for the geographical area at 1010. The process 1000 may include generating a barrier-aware road graph using the road infrastructure data and the barrier geospatial vector data for the geographical area at 1012. The process 1000 may include generating a plurality of clusters of the data points by iteratively invoking a capacitated K-means algorithm that uses the spatial distribution of the data points at 1014. In embodiments, the capacitated K-means algorithm is invoked, iteratively, until the expiration of a certain time period that is user specified or pre-defined.

The process 1000 may include generating a first set of polygons for the plurality of clusters for the geographical area using a concave hull algorithm at 1016. The process 1000 may include generating a second set of polygons based on a barrier constrained network Voronoi algorithm that uses the barrier-aware road graph and the first set of polygons as seeds at 1018. The process 1000 may include modifying the second set of polygons using a bounded Voronoi algorithm that uses a raster cost allocation based on barrier penalties from the barrier geospatial vector data at 1020. In embodiments, the barrier penalties from the barrier geospatial vector data are different than the barrier-penalized constraint of the barrier-aware road graph. For example, the barrier penalties from the barrier geospatial vector data may assign a multiplicative penalty for crossing a hard barrier such as a major highway or body of water. The process 1000 may include determining coordinates for each polygon of the modified second set of polygons, that divide the geographical area at 1022. In accordance with at least one embodiment, the service provider computers may generate a sequence trace route for the geographical area using the modified second set of polygons which identifies a sequence for each polygon of the modified second set of polygons. The sequence for each polygon may be used to determine delivery routes that are generated for the geographical area.

In architecture 1100, one or more users 1102 (e.g., delivery associates and/or entities associated with computer systems implementing the district generation feature) may utilize user computing devices 1104(1)-(N) (collectively, user devices 1104) to access a browser application 1106 or a user interface (UI) accessible through the browser application 1106 and via one or more networks 1108, to receive delivery routes, delivery sequences, or updates to coordinates districts of a geographical area which may be presented and interacted with via browser application 1106 or the UI accessible through the browser application 1106. The "browser application" 1106 can be any browser control or native application that can access and display a network page or other information. A native application may include an application or program that has been developed for use on a particular platform (such as an operating system) or a particular device (such as a particular type of mobile device).

In accordance with at least one embodiment, the user devices 1104 may be configured for communicating with service provider computers 1114 and facility computers 1130 via networks 1108. The user devices 1104 may include at least one memory 1110 and one or more processing units or processor(s) 1112. The memory 1110 may store program instructions that are loadable and executable on the processor(s) 1112, as well as data generated during the execution of these programs. Depending on the configuration and type of the user devices 1104, the memory 1110 may be volatile (such as random access memory (RAM)) and/or non-volatile (such as read-only memory (ROM), flash memory, etc.). The user devices 1104 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1104. In some implementations, the memory 1110 may include multiple different types of memory, such as static random access memory (SRAM), dynamic random access memory (DRAM), or ROM. The user devices 1104 may also include GPS receivers and other components (hardware and/or software) for determining a location of the user devices 1104 during a delivery of an item/package.

Turning to the contents of the memory 1110 in more detail, the memory 1110 may include an operating system and one or more application programs or services for implementing the features disclosed herein. Additionally, the memory 1110 may include one or more modules for implementing the features described herein including a district generation module 1138.

The architecture 1100 may also include one or more service provider computers 1114 that may, in some examples, provide computing resources such as, but not limited to, client entities, low latency data storage, durable data storage, data access, management, virtualization, hosted computing environment or "cloud-based" solutions, geofence generation feature implementation, etc. The service provider computers 1114 may implement or be an example of the service provider computer(s) described herein with reference to FIGS. 1-10B and throughout the disclosure. The one or more service provider computers 1114 may also be operable to provide site hosting, computer application development, and/or implementation platforms, combinations of the foregoing, or the like to the one or more users 1102 via user devices 1104.

In some examples, the networks 1108 may include any one or a combination of many different types of networks, such as cable networks, the Internet, wireless networks, cellular networks, and other private and/or public networks. While the illustrated examples represent the users 1102 communicating with the service provider computers 1114 over the networks 1108, the described techniques may equally apply in instances where the users 1102 interact with the one or more service provider computers 1114 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.). In embodiments, the users 1102 may communicate with the facility computers 1130 via networks 1108, and the facility computers 1130 may communicate with the service provider computers 1114 via networks 1108. In some embodiments, the service provider computers 1114 may communicate, via networks 1108, with one or more third party computers (not pictured) to obtain data inputs for the various algorithms of the district generation features described herein. In accordance with at least one embodiment, the service provider computers 1114 may receive historical delivery demand data for a particular geographic area that corresponds to an area serviced by a third party via associated third party computers (not pictured) for generating districts on behalf of the third party.

The one or more service provider computers 1114 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1114 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 1114 may be in communication with the user device 1104 via the networks 1108, or via other network connections. The one or more service provider computers 1114 may include one or more servers, perhaps arranged in a cluster or as individual servers not associated with one another. In embodiments, the service provider computers 1114 may be in communication with one or more third party computers (not pictured) via networks 1108 to receive or otherwise obtain data including geospatial vector data, barrier geospatial vector data, road infrastructure data, historical delivery demand data, or other suitable information for generating districts and determining coordinates for said districts for a geographical area as described herein.

In one illustrative configuration, the one or more service provider computers 1114 may include at least one memory 1116 and one or more processing units or processor(s) 1118. The processor(s) 1118 may be implemented as appropriate in hardware, computer-executable instructions, firmware, or combination thereof. Computer-executable instruction or firmware implementations of the processor(s) 1118 may include computer-executable or machine-executable instructions written in any suitable programming language to perform the various functions described when executed by a hardware computing device, such as a processor. The memory 1116 may store program instructions that are loadable and executable on the processor(s) 1118, as well as data generated during the execution of these programs. Depending on the configuration and type of the one or more service provider computers 1114, the memory 1116 may be volatile (such as RAM) and/or non-volatile (such as ROM, flash memory, etc.). The one or more service provider computers 1114 or servers may also include additional storage 1120, which may include removable storage and/or non-removable storage. The additional storage 1120 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1116 may include multiple different types of memory, such as SRAM, DRAM, or ROM.

The memory 1116, the additional storage 1120, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1116 and the additional storage 1120 are all examples of non-transitory computer storage media. Additional types of non-transitory computer storage media that may be present in the one or more service provider computers 1114 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1114. Combinations of any of the above should also be included within the scope of non-transitory computer-readable media.

The one or more service provider computers 1114 may also contain communication connection interface(s) 1122 that allow the one or more service provider computers 1114 to communicate with a data store, another computing device or server, user terminals, and/or other devices on the networks 1108. The one or more service provider computers 1114 may also include I/O device(s) 1124, such as a keyboard, a mouse, a pen, a voice input device, a touch input device, a display, speakers, a printer, etc.

Turning to the contents of the memory 1116 in more detail, the memory 1116 may include an operating system 1126, one or more data stores 1128, and/or one or more application programs or services for implementing the features disclosed herein including the district generation module 1138. The architecture 1100 includes facility computers 1130. In embodiments, the service provider computers 1114 and the district generation module 1138 may be configured to generate and transmit instructions, via networks 1108, to components 1136 in communication or otherwise associated with facility computers 1130. For example, the instructions may be configured to activate or otherwise trigger an actuator or other electromechanical device of component 1136 for diverting, moving, or otherwise transporting items within a facility associated with the facility computers 1130 based on the districts generated according to the district generation features described herein. The facility computers 1130 may include at least one memory 1132 and one or more processing units or processor(s) 1134. The memory 1132 may store program instructions that are loadable and executable on the processor(s) 1134, as well as data generated during the execution of these programs. Depending on the configuration and type of the facility computers 1130, the memory 1132 may be volatile (such as random access memory (RAM)) and/or non-volatile (such as read-only memory (ROM), flash memory, etc.). The facility computers 1130 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the facility computers 1130. In some implementations, the memory 1132 may include multiple different types of memory, such as static random access memory (SRAM), dynamic random access memory (DRAM), or ROM.

Turning to the contents of the memory 1132 in more detail, the memory 1132 may include an operating system and one or more application programs or services for implementing the features disclosed herein. Additionally, the memory 1132 may include one or more modules for implementing the features described herein including a district generation module 1138. In embodiments, the service provider computers 1114 and the district generation module 1138 may generate delivery routes or updated delivery routes which are transmitted to user device 1104 via networks 1108. The user device 1104 and browser application 1106 may be configured to update a presented user interface to present the delivery routes to user 1102. In accordance with at least one embodiment, the district generation module 1138 may be configured to receive or obtain geospatial vector data, barrier geospatial vector data, road infrastructure data, and historical delivery demand data for a geographic area. In embodiments, some, a portion, or all of these data points may be stored and transmitted as Shapefiles and coordinates, respectively. In accordance with at least one embodiment, each data input may be extracted from a Shapefile for a geographical area. In embodiments, the district generation module 1138 may be configured to implement one or more algorithms, such as a stratified sampling algorithm, a capacitated K-means algorithm, a concave hull algorithm, a Geoatom algorithm, barrier constrained network Voronoi algorithm, a bounded Voronoi algorithm that uses a raster cost allocation, and other suitable algorithms, to determine a plurality of polygons and coordinates for the plurality of polygons that represent and divide the geographical area into one or more districts. In embodiments, a polygon of the plurality polygons may be distinct for each seed concave hull polygon of the geographical area generated from the plurality of clusters of the spatial distribution of data points from the historical delivery demand data for the geographical area.

The district generation module 1138 may be configured to generate and transmit a user interface or data objects for updating a user interface presented via browser application 1106 and user device 1104 for presenting the boundaries and/or coordinates for the generated districts for a geographical area as well as delivery routes for navigating the generated districts and delivering packages to one or more delivery locations within the geographical area. Other graphical updates, feedback mechanisms, and data object generation associated with the district generation features described herein may be implemented by the service provider computers 1114 and the district generation module 830. In embodiments, the district generation module 1138 may be configured to determine a spatial distribution of data points from historical delivery demand data for a geographical area by implementing a stratified sampling algorithm. The district generation module 1138 may be configured to generate a barrier-aware road graph using road infrastructure data and barrier geospatial vector data for the geographical area. The district generation module 1138 may be configured to implement and iteratively invoke a capacitated K-means algorithm to generate a plurality of clusters of the data points using the spatial distribution of data points.

The district generation module 1138 may be configured to implement and invoke a concave hull algorithm to generate a first set of polygons (concave hull polygons) for the plurality of clusters for the geographical area. The district generation module 1138 may be configured to implement and invoke a Geoatom algorithm that uses the road infrastructure data and the barrier geospatial vector data for the geographical area to generate a second set of polygons (hierarchy of Geoatom polygon families). The district generation module 1138 may be configured to implement and invoke a barrier constrained network Voronoi algorithm that uses the barrier-aware road graph and the first set of polygons (concave hull polygons) as seeds to generate a third set of polygons for the geographical area. The district generation module 1138 may be configured to modify the third set of polygons by implementing and iteratively invoking an algorithm for merging a particular polygon of the third set of polygons with a respective polygon of the second set of polygons based on a determination that the respective polygon overlaps only with the particular polygon. In embodiments, the district generation module 1138 may be configured to update the modified third set of polygons by implementing and invoking a bounded Voronoi algorithm that uses a raster cost allocation based on barrier penalties from the barrier geospatial vector data. This process fills the gaps between the third set of polygons for the geographical area and the second set of polygons for the geographical area which corresponds to generating complex polygons which are not only barrier aware but road-network aware as described herein.

Figure 12:
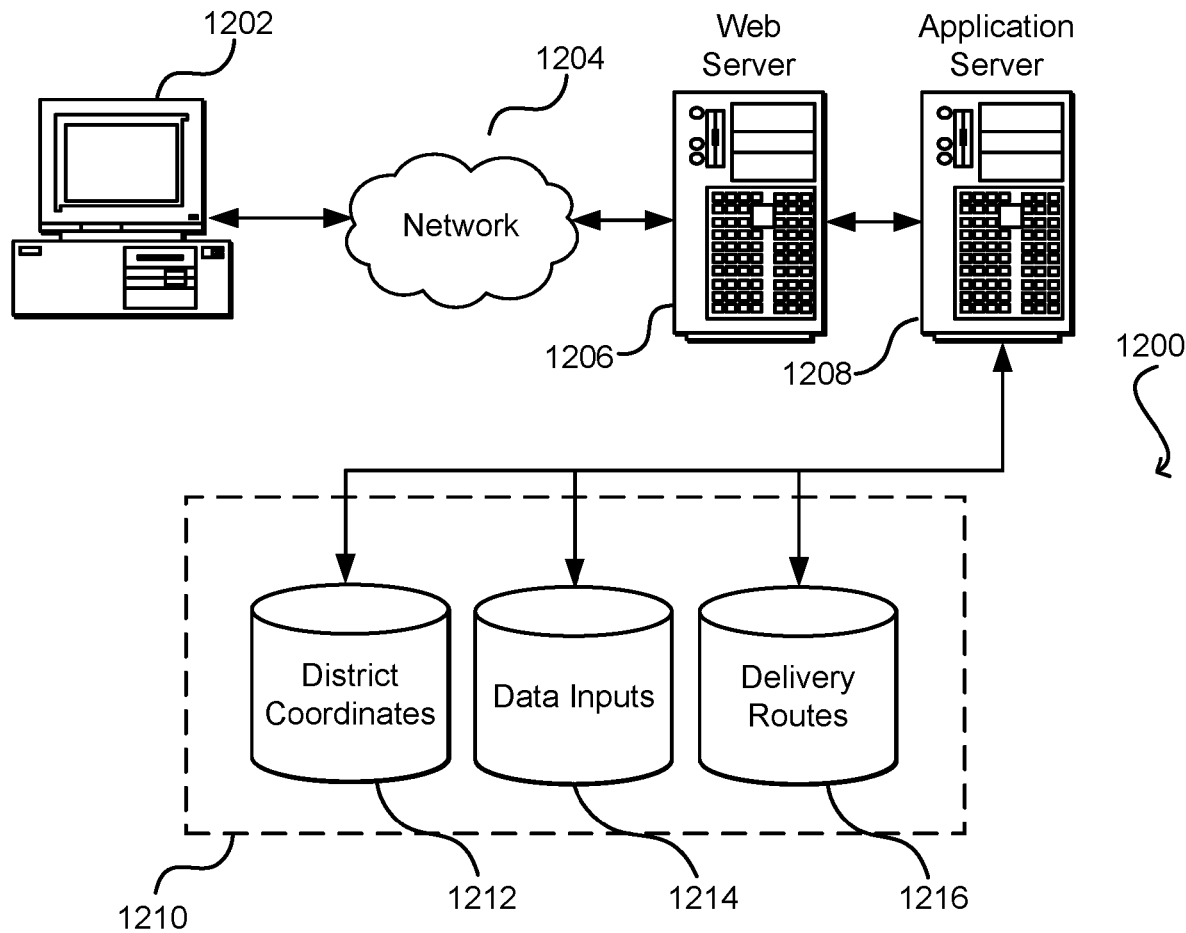
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device 1202. Examples of such electronic client devices include personal computers, cell phones, handheld messaging devices, laptop computers, set-top boxes, personal data assistants, electronic book readers, and the like. The network 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 1204 can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 1208 can include any appropriate hardware and software for integrating with the data store as needed to execute aspects of one or more applications for the client device 1202, handling a majority of the data access and business logic for an application. The application server 1208 provides access control services in cooperation with the data store 1210 and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server 1206. It should be understood that the Web and application servers (1206 and 1208) are not required and are merely example components, as the structured code discussed herein can be executed on any appropriate device or host machine as discussed elsewhere herein.

The data store 1210 can include several separate data tables, databases, or other data storage mechanisms and media for storing data relating to a particular aspect. For example, the data store 1210 illustrated includes mechanisms for storing district coordinates 1212 and delivery routes 1216, which can be used to serve content for the production side, generate districts, which includes generating coordinates for dividing a geographical area into geographical units, and generating delivery routes for delivery entities to deliver packages within the geographical area. The data store 1210 also is shown to include a mechanism for storing data inputs 1214, which can be used for reporting, analysis, or other such purposes, such as by one or more algorithms for generating the districts or polygons that represent the districts, as well as generate instructions for modulating components of facilities to divert packages based on the generated districts for a geographical area. It should be understood that there can be many other aspects that may need to be stored in the data store, such as page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed on a dedicated page or window in the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft©, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from those described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system, barrier geospatial vector data for a geographical area;
    obtaining, by the computer system, road infrastructure data for the geographical area, the road infrastructure data including road classes assigned to each road for the road infrastructure data;
    obtaining, by the computer system, historical delivery demand data for the geographical area;
    determining, by the computer system, a spatial distribution of data points from the historical delivery demand data for the geographical area;
    generating, by the computer system, a barrier-aware road graph using the road infrastructure data and the barrier geospatial vector data for the geographical area;
    generating, by the computer system, a plurality of clusters of the data points based at least in part on iteratively invoking a first algorithm that uses the spatial distribution of the data points;
    generating, by the computer system, a first set of polygons for the plurality of clusters for the geographical area, each polygon of the first set of polygons associated with a unique cluster of the plurality of clusters;
    generating, by the computer system, a second set of polygons based at least in part on the road infrastructure data and the barrier geospatial vector data;
    generating, by the computer system, a third set of polygons based at least in part on the barrier-aware road graph, penalties generated from the road classes of the road infrastructure data, and the first set of polygons;
    modifying, by the computer system, the third set of polygons by iteratively invoking a second algorithm configured to merge a particular polygon of the third set of polygons with a respective polygon of the second set of polygons based at least in part on a determination that the respective polygon overlaps with the particular polygon;
    updating, by the computer system, the modified third set of polygons using a raster cost allocation based at least in part on barrier penalties from the barrier geospatial vector data; and
    determining, by the computer system, coordinates for each polygon of the updated third set of polygons that divide the geographical area.

2. The computer-implemented method of claim 1, wherein the historical delivery demand data includes population density information for the geographical area.

3. The computer-implemented method of claim 1, wherein the first algorithm uses constraints associated with demand volume for each cluster of the plurality of clusters, the constraints including a maximum demand volume and a minimum demand volume, the maximum demand volume and the minimum demand volume being specified by a user associated with the computer system.

4. The computer-implemented method of claim 1, further comprising:
    generating, by the computer system, instructions for an actuator of a component of a delivery station located within the coordinates for a polygon of the updated third set of polygons based at least in part on the coordinates for the polygon and orders for delivery of a number of items stored at the delivery station, the instructions configured to modulate the actuator of the component to divert a portion of the number of items to different bins of the delivery station; and
    transmitting, by the computer system, the instructions to the actuator.

5. A non-transitory computer-readable storage medium storing computer-executable instructions that, when executed by a computer system, configure the computer system to perform operations comprising:
    obtaining barrier geospatial vector data for a geographical area;
    obtaining road infrastructure data for the geographical area, the road infrastructure data including road classes assigned to each road for the road infrastructure data;
    obtaining historical delivery demand data for the geographical area;
    determining a spatial distribution of data points from the historical delivery demand data for the geographical area;
    generating a barrier-aware road graph using the road infrastructure data and the barrier geospatial vector data for the geographical area;
    generating a plurality of clusters of the data points based at least in part on iteratively invoking a first algorithm that uses the spatial distribution of the data points;

generating a first set of polygons for the plurality of clusters for the geographical area, each polygon of the first set of polygons associated with a unique cluster of the plurality of clusters;

generating a second set of polygons based at least in part on the barrier-aware road graph, penalties generated from the road classes of the road infrastructure data, and the first set of polygons;

updating the second set of polygons using a raster cost allocation based at least in part on barrier penalties from the barrier geospatial vector data; and determining coordinates for each polygon of the updated second set of polygons that divide the geographical area.

6. The non-transitory computer-readable storage medium of claim 5, wherein the first algorithm uses barrier-penalized constraints of the barrier-aware road graph that are different than the barrier penalties from the geospatial vector data.

7. The non-transitory computer-readable storage medium of claim 5, wherein the instructions, when executed by the computer system, further configure the computer system to perform operations comprising generating a sequence trace route for the geographical area using the updated second set of polygons, the sequence trace route identifying a sequence for each polygon of the updated second set of polygons.

8. The non-transitory computer-readable storage medium of claim 7, wherein the instructions, when executed by the computer system, further configure the computer system to perform operations comprising generating delivery routes for the geographical area using the sequence trace route.

9. The non-transitory computer-readable storage medium of claim 8, wherein the instructions, when executed by the computer system, further configure the computer system to perform operations comprising transmitting a delivery route of the delivery routes to a user device, the delivery route causing an update to a user interface of the user device and identifying the sequence trace route.

10. The non-transitory computer-readable storage medium of claim 5, wherein the instructions, when executed by the computer system, further configure the computer system to perform operations comprising obtaining regulatory constraint information for the geographical area and exclusion zone information for the geographical area.

11. The non-transitory computer-readable storage medium of claim 10, wherein the instructions, when executed by the computer system, further configure the computer system to perform operations comprising obtaining user-specified input for a number of polygons to be generated for the geographical area.

12. The non-transitory computer-readable storage medium of claim 11, wherein generating the plurality of clusters of the data points is further based at least in part on the regulatory constraint information, the exclusion zone information, and the user-specified input.

13. The non-transitory computer-readable storage medium of claim 5, wherein the first algorithm is invoked, iteratively, until expiration of a certain time period.

14. A computer system comprising:
a memory configured to store computer-executable instructions; and
a processor in communication with the memory configured to execute the computer-executable instructions to at least:
obtain barrier geospatial vector data for a geographical area;
obtain road infrastructure data for the geographical area, the road infrastructure data including road classes assigned to each road for the road infrastructure data;
obtain historical delivery demand data for the geographical area;
determine a spatial distribution of data points from the historical delivery demand data for the geographical area;
generate a barrier-aware road graph using the road infrastructure data and the barrier geospatial vector data for the geographical area;
generate a plurality of clusters of the data points based at least in part on iteratively invoking a first algorithm that uses the spatial distribution of the data points;
generate a first set of polygons for the plurality of clusters for the geographical area, each polygon of the first set of polygons associated with a unique cluster of the plurality of clusters;
generate a second set of polygons based at least in part on the road infrastructure data and the barrier geospatial vector data;
modify the first set of polygons by iteratively invoking a second algorithm configured to merge a particular polygon of the first set of polygons with a respective polygon of the second set of polygons based at least in part on a determination that the respective polygon overlaps with the particular polygon;
update the modified first set of polygons using a raster cost allocation based at least in part on barrier penalties from the barrier geospatial vector data; and
determine coordinates for each polygon of the updated first set of polygons that divide the geographical area.

15. The computer system of claim 14, wherein each road class of the road classes is associated with unique road characteristics that correspond to a type of road.

16. The computer system of claim 14, wherein the processor in communication with the memory is configured to execute the computer-executable instructions to at least determine a third set of polygons for areas within a certain proximity of barriers in the geographical area based at least in part on the barrier geospatial vector data and the road infrastructure data, the areas lacking roads or including only a portion of a road.

17. The computer system of claim 16, wherein generating the second set of polygons is further based at least in part on the third set of polygons.

18. The computer system of claim 14, wherein the second algorithm traverses the second set of polygons based on a hierarchy of polygon families for the respective polygon based on a determination that the respective polygon does not overlap with the particular polygon.

19. The computer system of claim 14, wherein the first algorithm uses barrier-penalized constraints that based at least in part on a multiplicative penalty applied to an edge of a road segment that crosses a barrier of the barrier geospatial vector data.

20. The computer system of claim 14, wherein the processor in communication with the memory is configured to execute the computer-executable instructions to at least:
generate instructions for an actuator of a component of a delivery station located within the coordinates for a polygon of the updated first set of polygons based at least in part on the coordinates for the polygon and orders for delivery of a number of items stored at the delivery station, the instructions configured to modulate the actuator of the component to divert a portion of the number of items to different bins of the delivery station; and transmit the instructions to the actuator.

* * * * *